Figure 1:
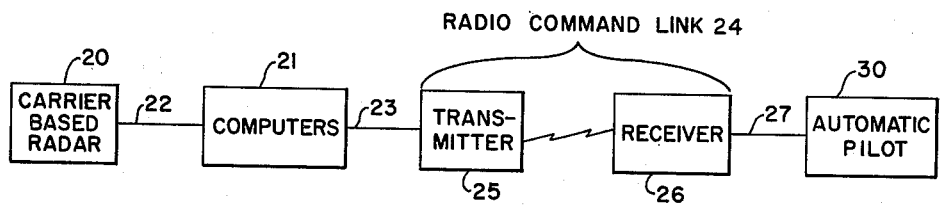

March 30, 1965  J. H. BALDWIN ETAL  3,175,788
AIRCRAFT CONTROL APPARATUS
Filed July 23, 1958  13 Sheets-Sheet 1

HENRY W. BERRY
ROBERT M. MADVIG
JOHN H. BALDWIN
BY George W. Field
ATTORNEY

March 30, 1965   J. H. BALDWIN ETAL   3,175,788
AIRCRAFT CONTROL APPARATUS
Filed July 23, 1958   13 Sheets-Sheet 2

HENRY W. BERRY
ROBERT M. MADVIG
JOHN H. BALDWIN
BY
*Garrett Field*
ATTORNEY

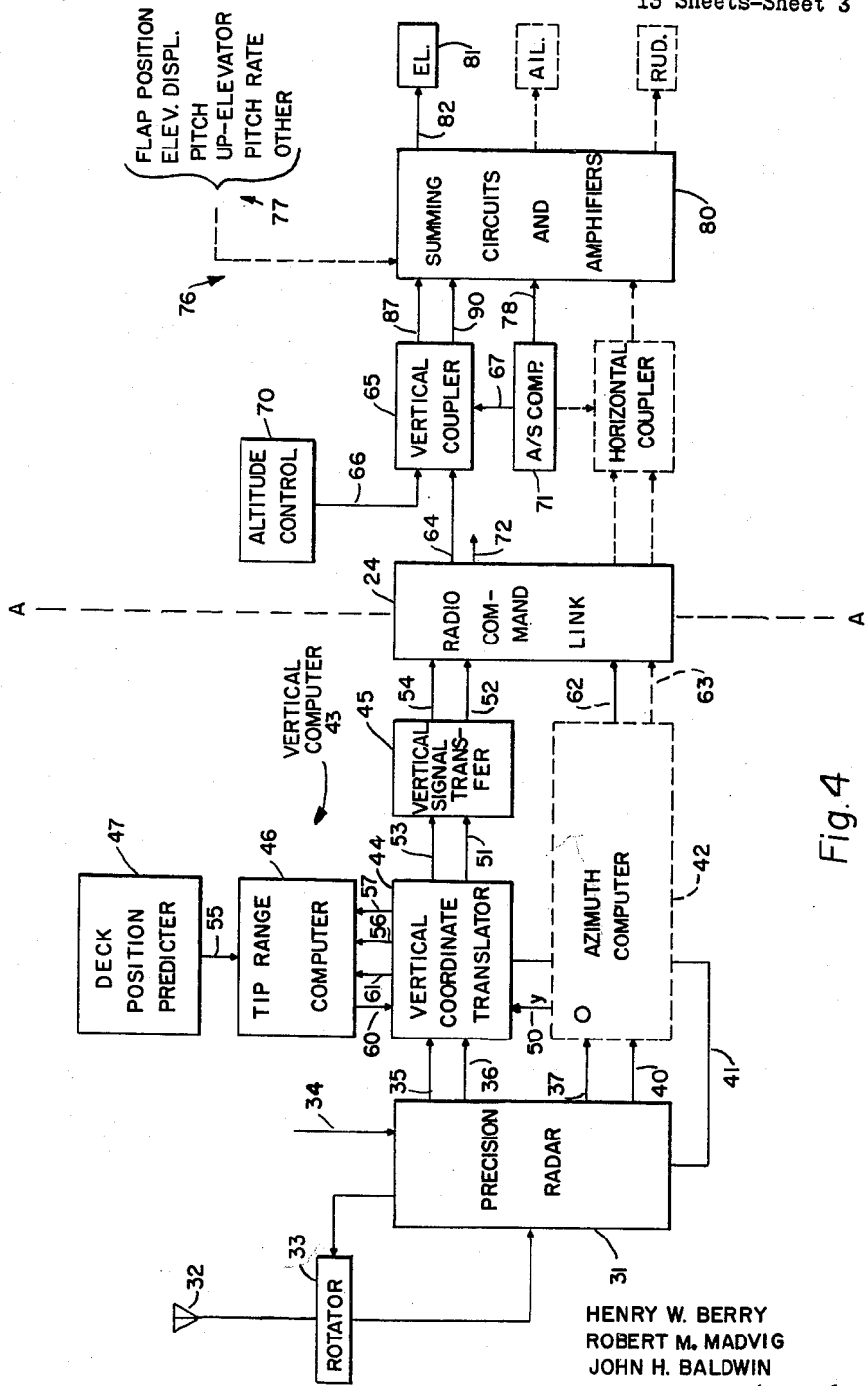

HENRY W. BERRY
ROBERT M. MADVIG
JOHN H. BALDWIN
BY
*George U. Field*
ATTORNEY

March 30, 1965  J. H. BALDWIN ETAL  3,175,788
AIRCRAFT CONTROL APPARATUS
Filed July 23, 1958  13 Sheets-Sheet 5

HENRY W. BERRY
ROBERT M. MADVIG
JOHN H. BALDWIN

BY *George M. Field*
ATTORNEY

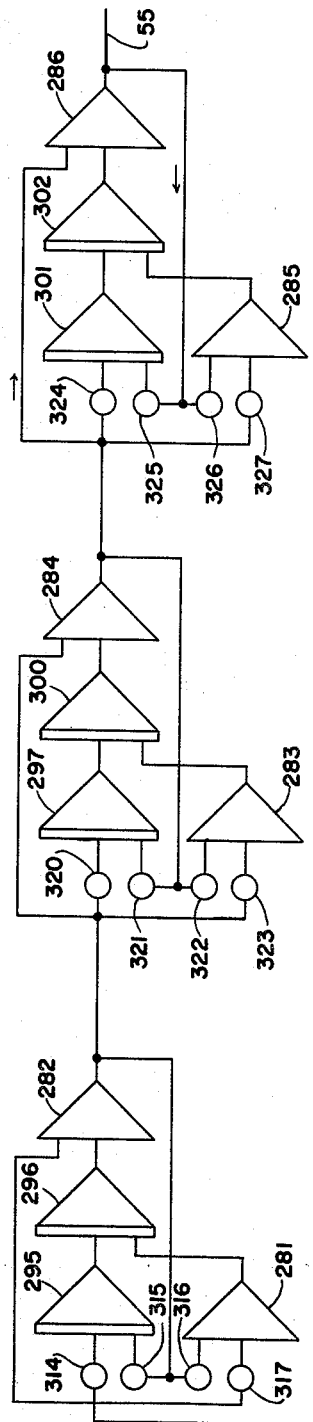
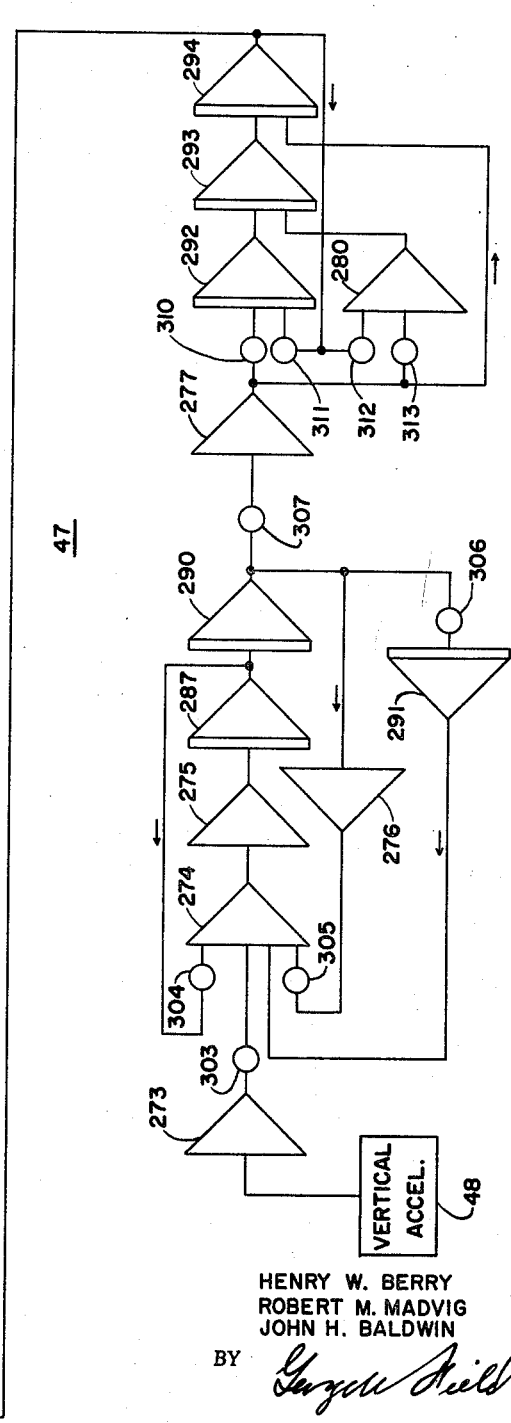
Fig. 9
HENRY W. BERRY
ROBERT M. MADVIG
JOHN H. BALDWIN
BY
ATTORNEY

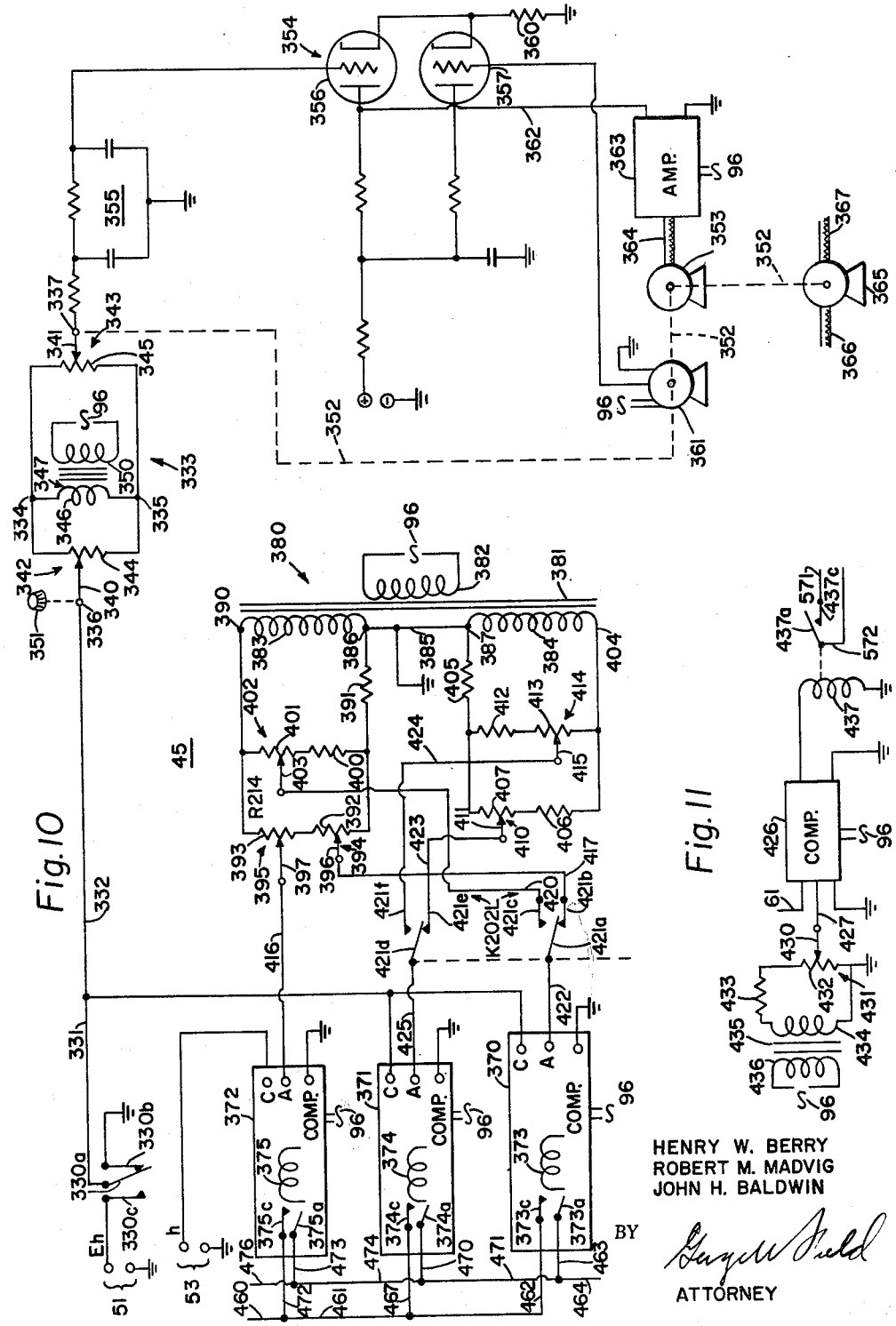

March 30, 1965  J. H. BALDWIN ETAL  3,175,788
AIRCRAFT CONTROL APPARATUS
Filed July 23, 1958                                    13 Sheets-Sheet 10

HENRY W. BERRY
ROBERT M. MADVIG
JOHN H. BALDWIN
BY
ATTORNEY

March 30, 1965 J. H. BALDWIN ETAL 3,175,788
AIRCRAFT CONTROL APPARATUS
Filed July 23, 1958 13 Sheets-Sheet 11

HENRY W. BERRY
ROBERT M. MADVIG
JOHN H. BALDWIN

BY
ATTORNEY

March 30, 1965   J. H. BALDWIN ETAL   3,175,788
AIRCRAFT CONTROL APPARATUS
Filed July 23, 1958   13 Sheets-Sheet 12

HENRY W. BERRY
ROBERT M. MADVIG
JOHN H. BALDWIN
BY
ATTORNEY

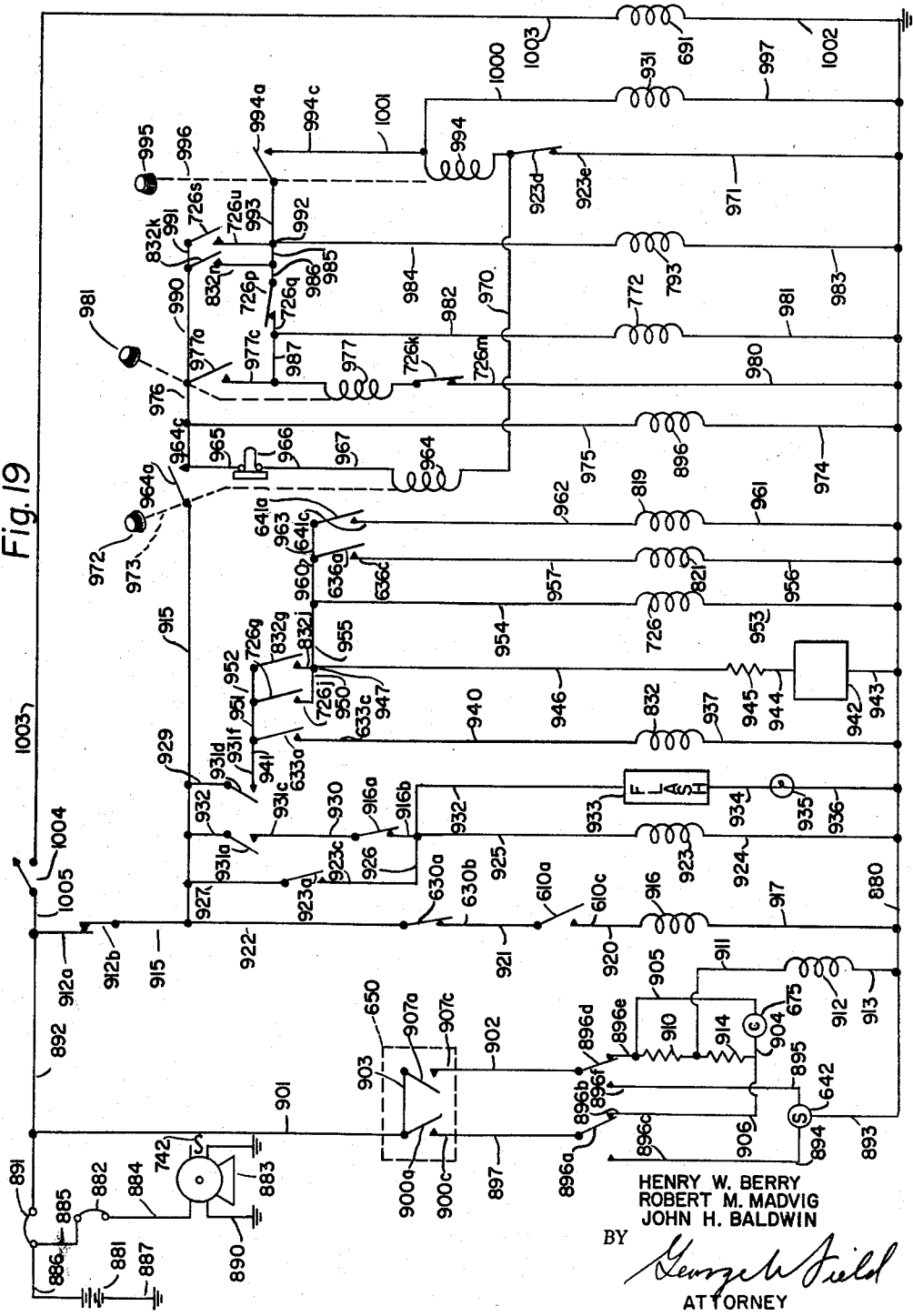

United States Patent Office

3,175,788
Patented Mar. 30, 1965

3,175,788
AIRCRAFT CONTROL APPARATUS
John H. Baldwin, Toronto, Ontario, Canada, Henry W. Berry, Largo, Fla., and Robert M. Madvig, Bloomington, Minn., assignors to Honeywell Inc., a corporation of Delaware
Filed July 23, 1958, Ser. No. 751,597
4 Claims. (Cl. 244—77)

This invention relates to the field of aviation, and more specifically to aircraft control in elevation to follow a desired path, sepecifically the nonlinear approach path used in bringing aircraft to land on the deck of an aircraft carrier at sea. The general system is shown in the copending application of Baldwin et al., Serial No. 751,594, filed July 23, 1958, now Patent No. 3,053,487. Control of the aircraft in azimuth is also included in the overall system, and apparatus for that purpose is more specifically disclosed in the copending application of Berry et al., Serial No. 751,596, filed July 23, 1958, now abandoned. Both of these copending applications are assigned to the assignee of the present application.

The apparatus embodying the present invention includes a carrier-based portion and an airborne portion, and is used during the final phase of an automatic landing during which the aircraft is observed by a precision radar which gives outputs representative of the altitude and closing speed of the aircraft and of its abscissa and ordinate on a set of Cartesian axes having its origin at the touchdown point and its axis of ordinates aligned with the landing strip on the carrier.

An azimuth computer corrects the two last named outputs for parallax between the location of the touchdown point and the location of the precision radar antenna, and controls the aircraft in azimuth through a radio command link and an automatic pilot in accordance with the parallax corrected signals, to maintain the aircraft on a predetermined nonlinear path in azimuth. At first the aircraft is maintained at a predetermined constant altitude.

A vertical computer receives the first two signals from the precision radar, and the parallax corrected ordinate signal from the azimuth computer, and controls the aircraft in elevation in accordance therewith through the radio command link and the automatic pilot, to maintain the aircraft on a predetermined nonlinear path in elevation, supplanting the constant altitude control.

Safety measures include disabling the airborne control system unless the landing flaps of the aircraft are down, and restoring control of the aircraft to the human pilot if the radio command link fails, if the precision radar loses "lock on," if the aircraft departs too widely from the predetermined path, or if it ever goes below a predetermined minimum altitude prior to its final descent.

It is a primary object of this invention to provide new and improved apparatus for controlling the flight of an aircraft in elevation. Other objects are to control an aircraft in elevation in accordance with observations of its position taken at a carrier or ground station, and to provide means for automatically controlling an aircraft to follow a nonlinear path in elevation with respect to such observations. Further broad objects are to compute at the carrier the proper time for an aircraft to begin its final approach to landing in view of the altitude error of the aircraft and the most probable elevational error of the carrier deck at the instant of touchdown, and to provide a smooth transition from level flight to flight at a desired glide angle for various initial altitudes of the aircraft.

Various other objects, advantages, and features of novelty which characterize the invention are pointed out with particularity in the claims annexed hereto and forming a part hereof. However, for a better understanding of the invention, its advantages, and objects attained by its use, reference should be had to the subjoining drawing, which forms a further part hereof, and to the accompanying descriptive matter, in which there is illustrated and described a preferred embodiment of the invention.

Figure 12:
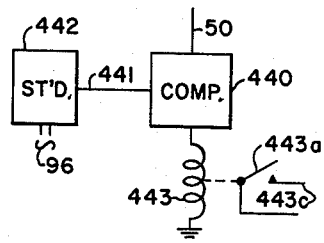
Figure 2:
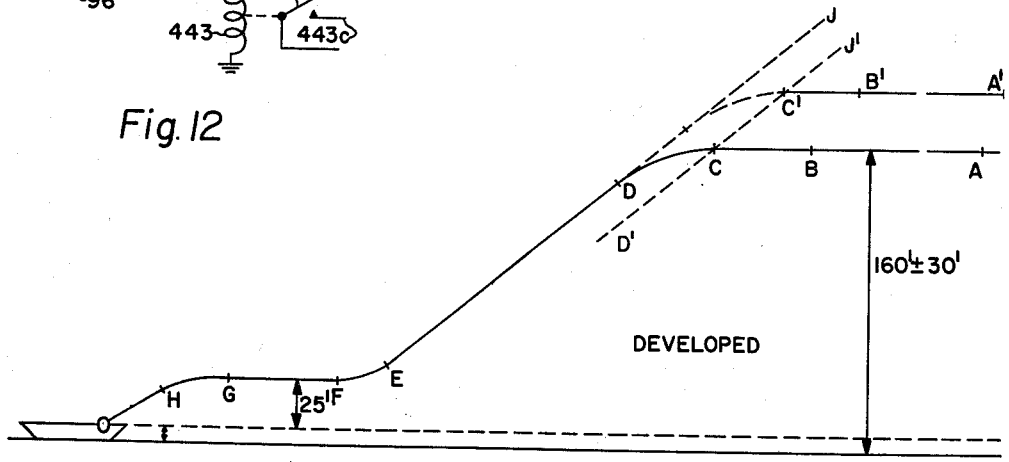
Figure 3:
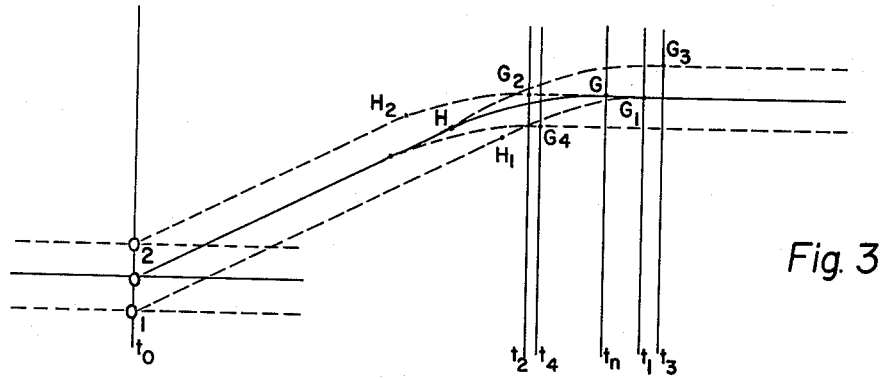
Figure 6:
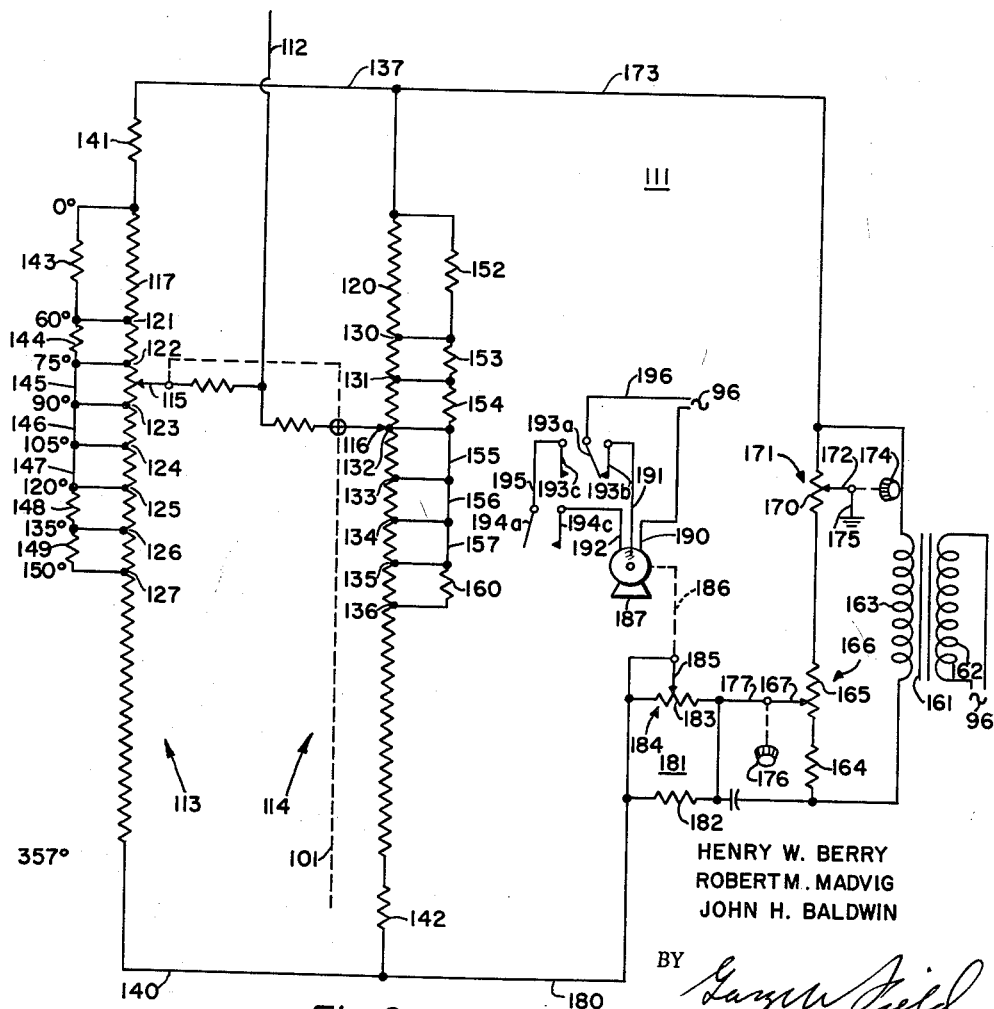
Figure 5:
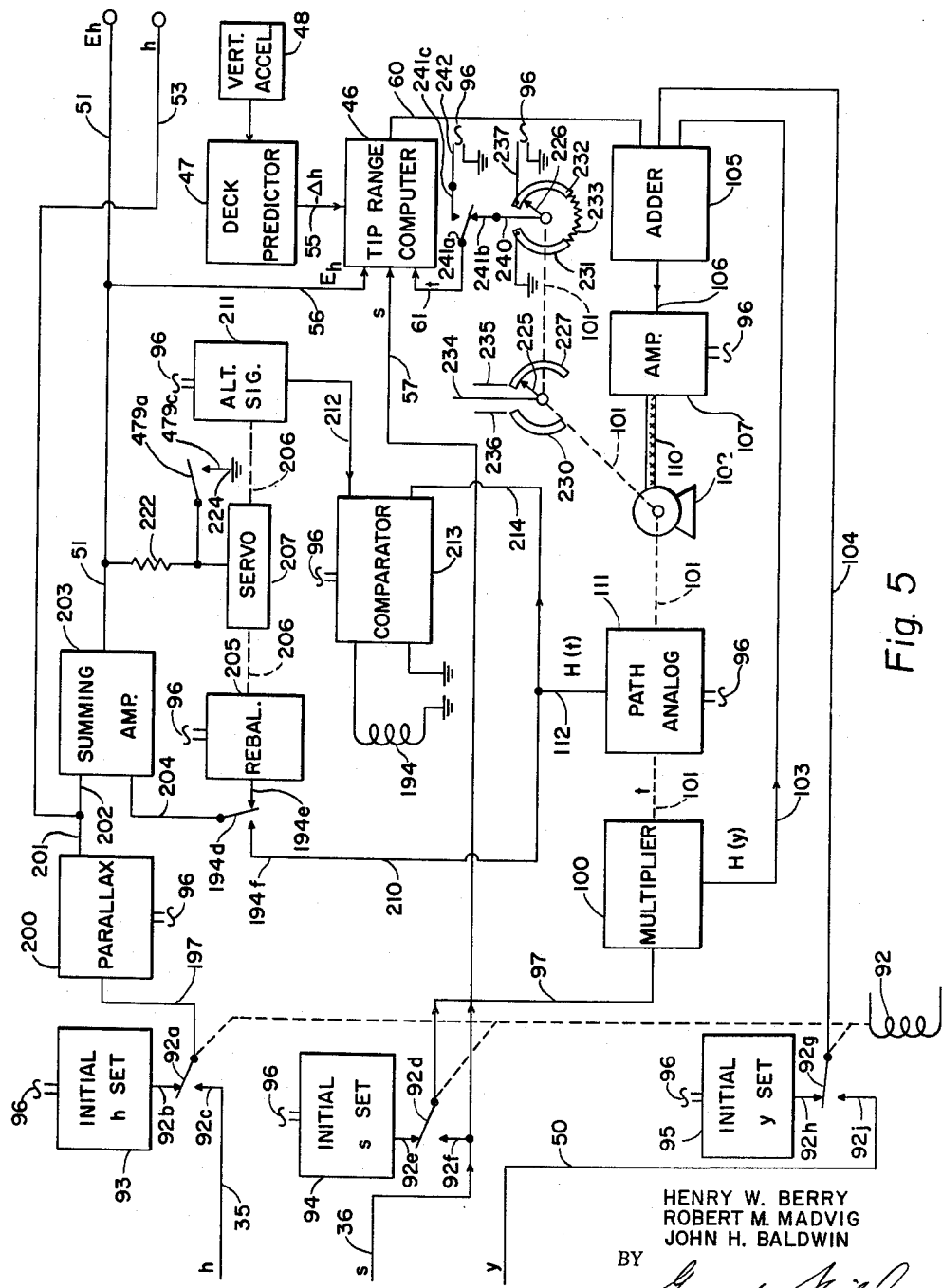
Figure 8:
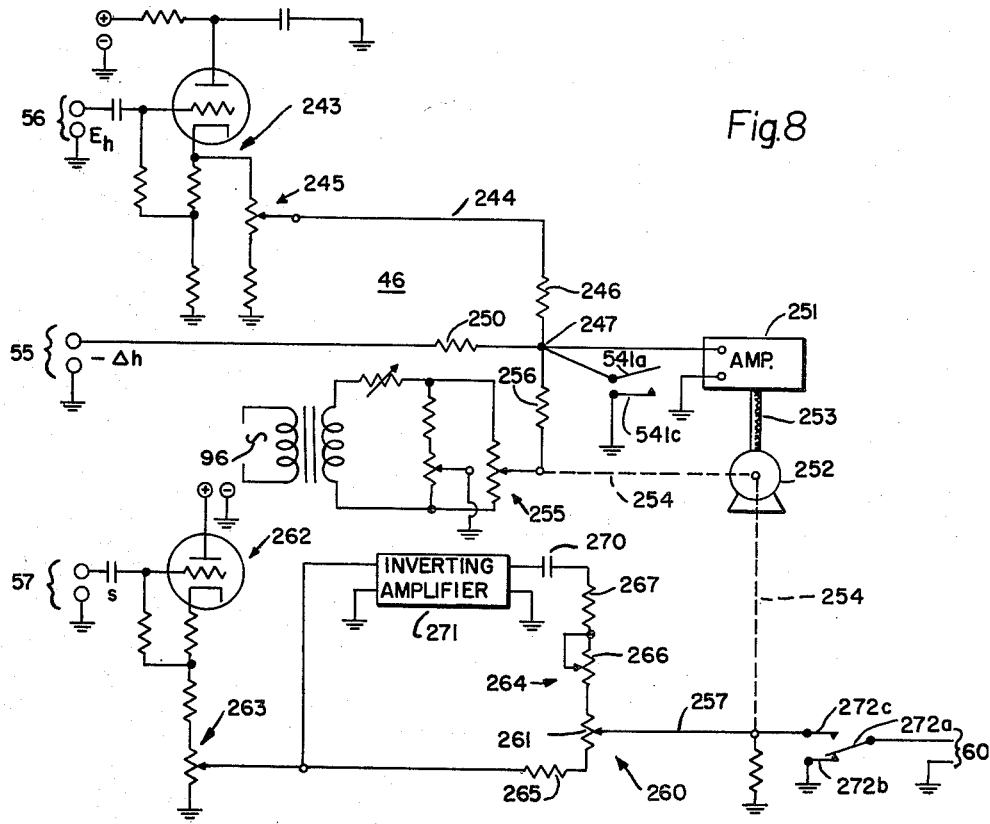
Figure 7:
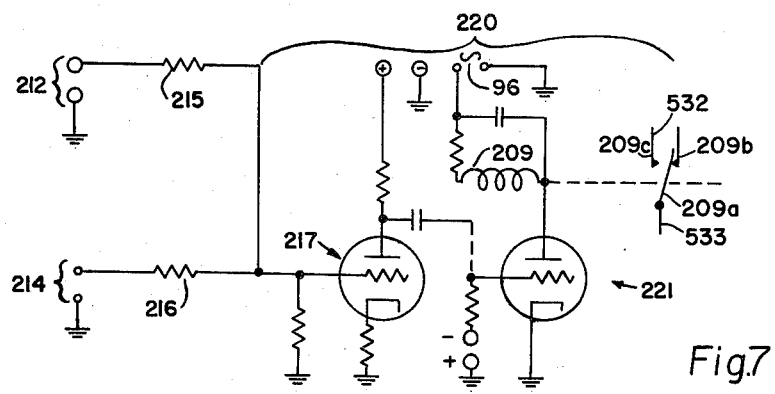
Figure 13:
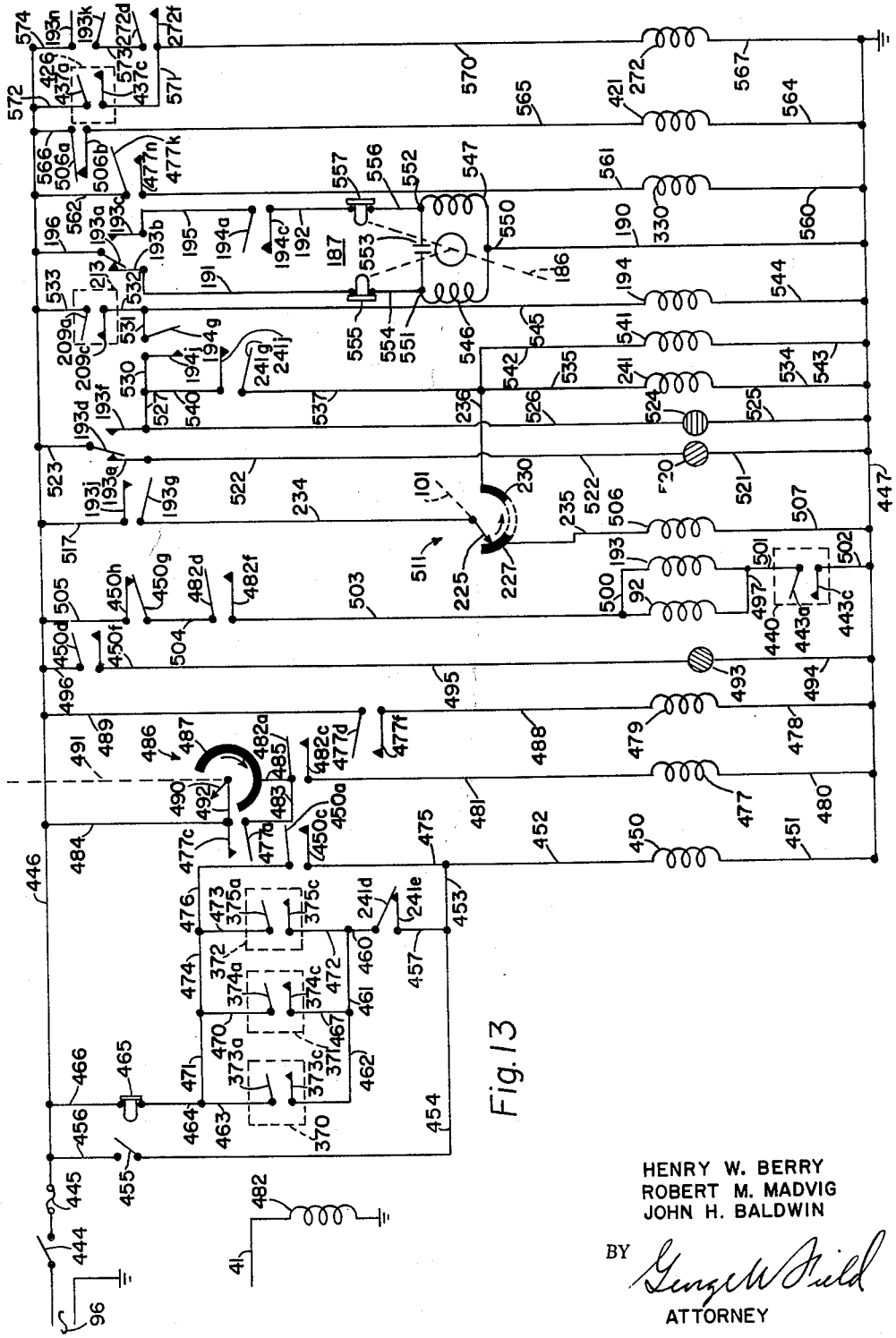
Figure 14:
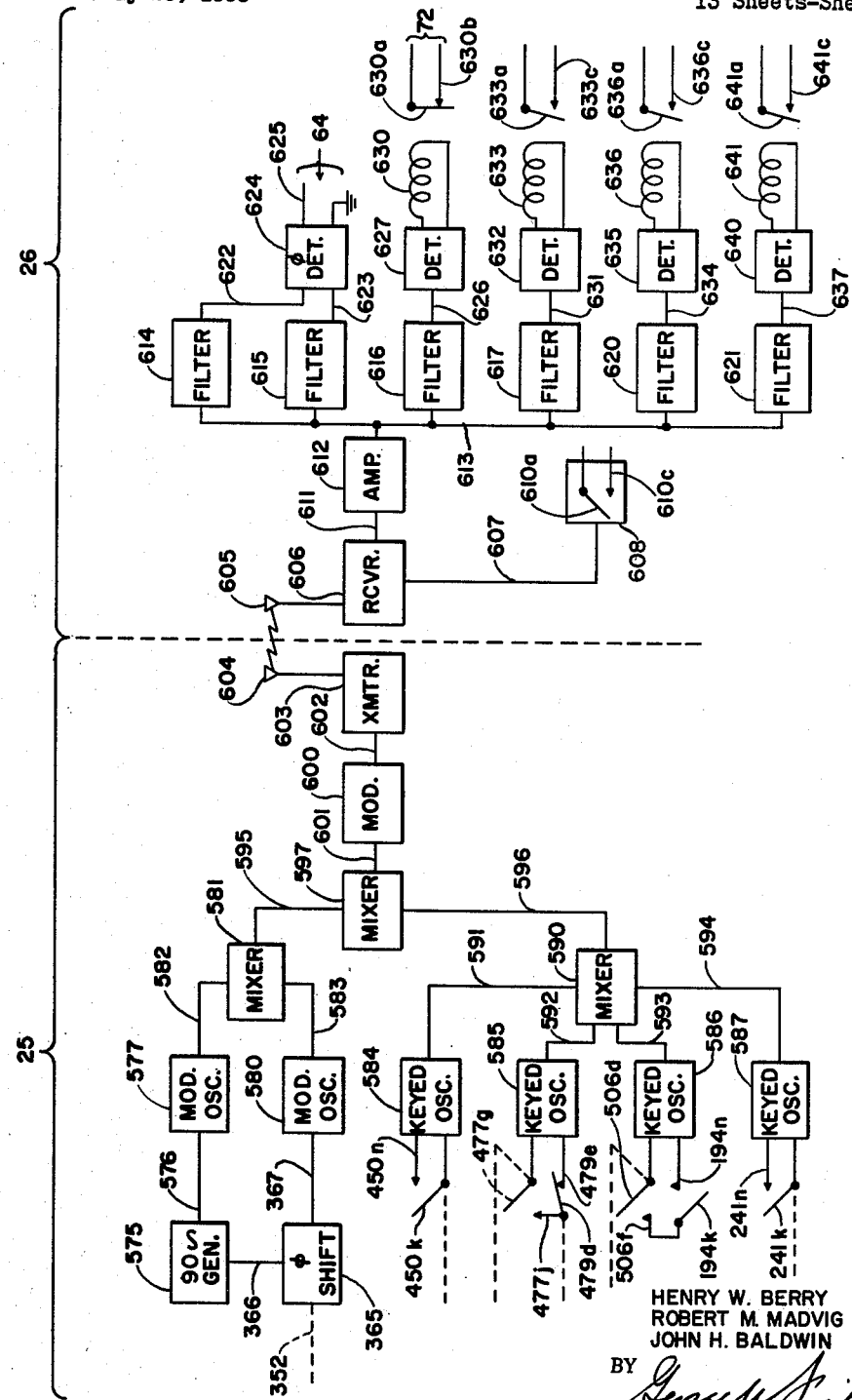
Figure 15:
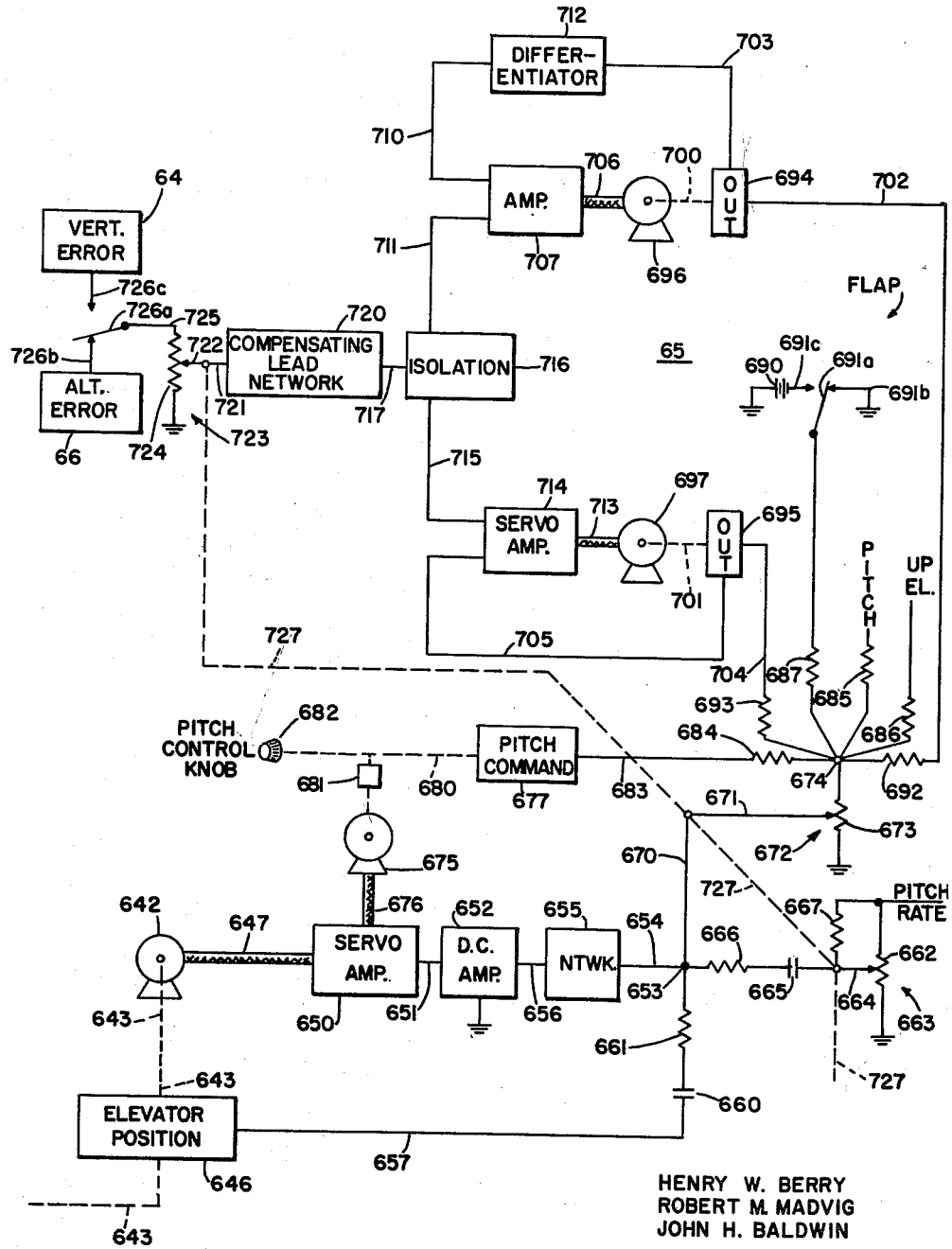
Figure 16:
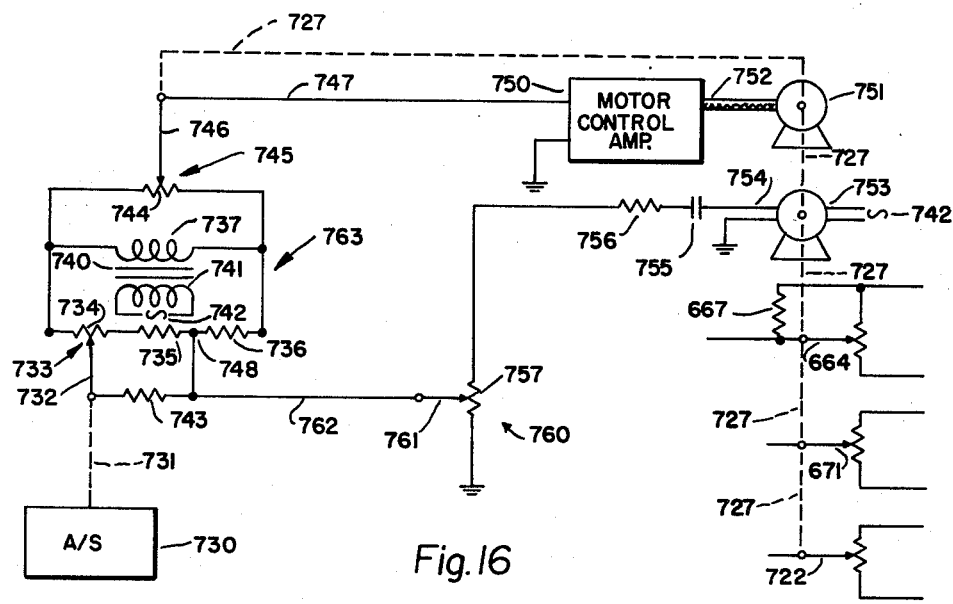
Figure 17:
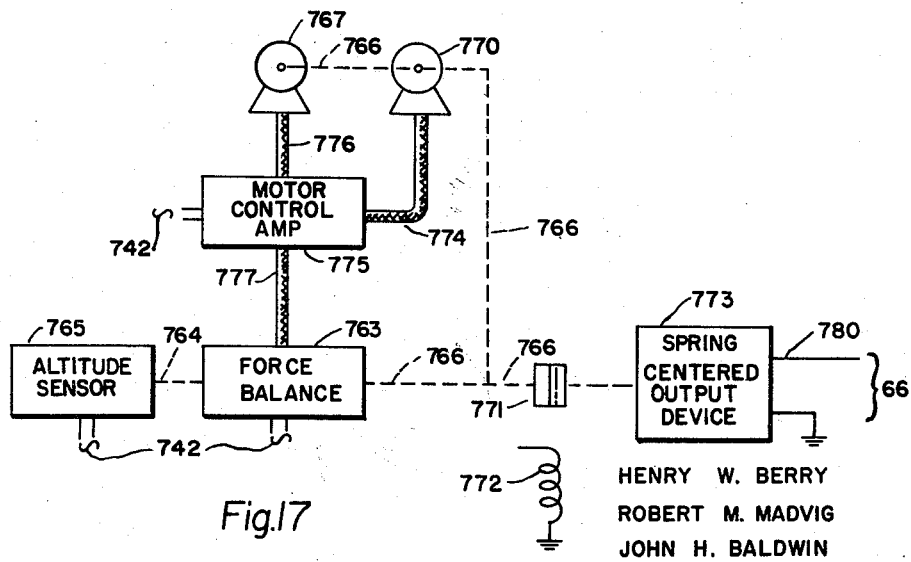
Figure 18:
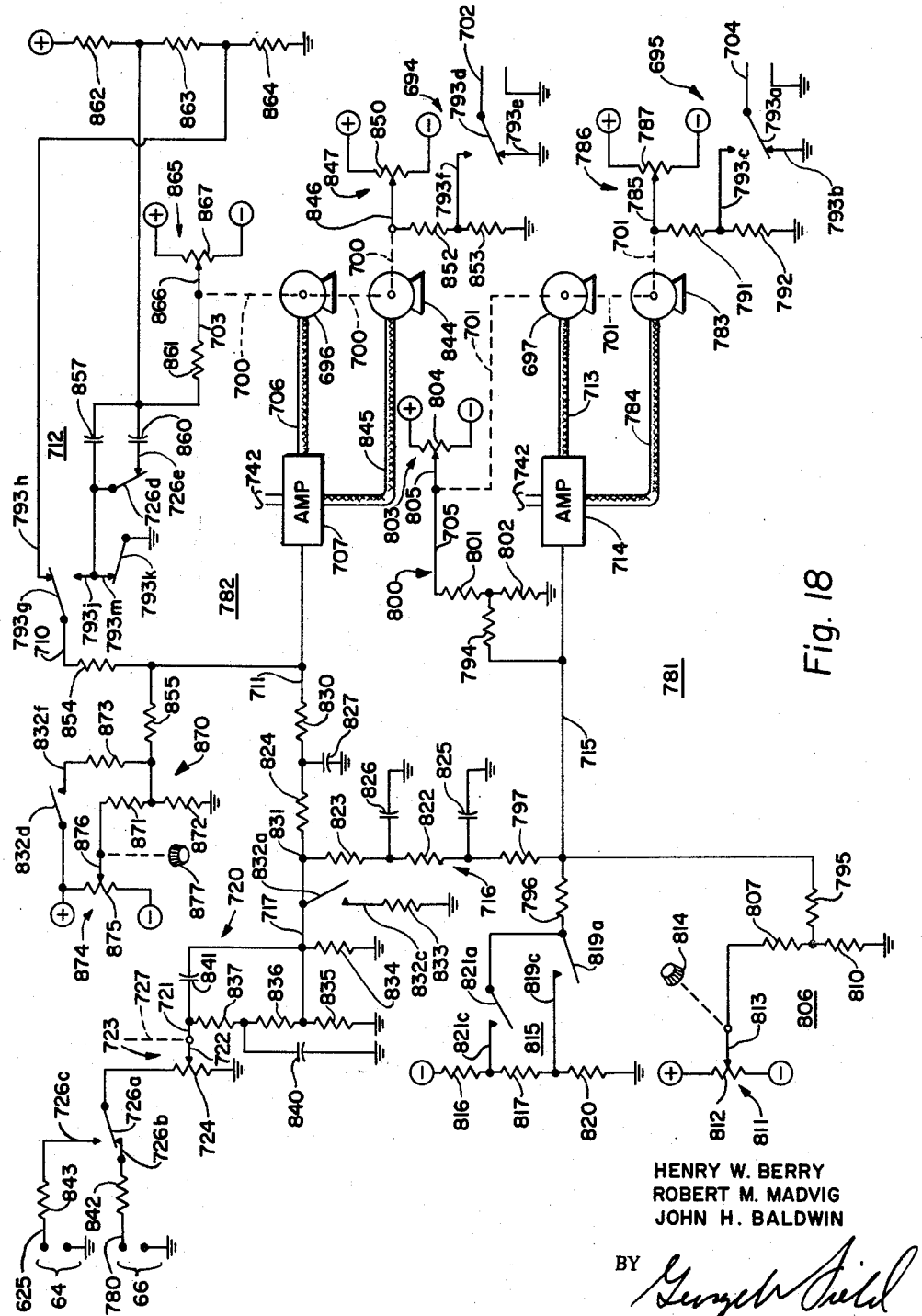

In the drawings, FIGURE 1 is a general block diagram of the vertical aircraft control system comprising the subject matter of the invention, FIGURE 2 is a diagram showing the vertical path of an aircraft using the inventive system, FIGURE 3 is a detailed enlargement of the final portion of FIGURE 2, FIGURE 4 is a more detailed block diagram of the general system, FIGURE 5 is a block diagram of a vertical coordinate translator comprising a portion of the invention, FIGURE 6 is a circuit diagram of an altitude analog or H(t) computer which is a portion of the vertical coordinate translator, FIGURE 7 is a circuit of a comparator used in the vertical coordinate translator, FIGURE 8 is a circuit diagram of a tip range computer used in the control system, FIGURE 9 is a functional diagram of a deck predictor used in the apparatus, FIGURE 10 is a circuit diagram of a vertical signal transfer control used in the practice of the invention, FIGURES 11 and 12 are diagrams of comparator circuits used in the equipment, FIGURE 13 is a wiring diagram of the control circuit of the carrier based equipment, FIGURE 14 is a functional diagram of the radio command link, FIGURE 15 is a circuit diagram of the elevator channel of an automatic pilot as used in the practice of the invention, FIGURE 16 is a circuit diagram of an airspeed compensator which comprises a portion of the automatic pilot, FIGURE 17 is a circuit diagram of an altitude control which comprises a portion of the automatic pilot, FIGURE 18 is a circuit diagram of a vertical coupler which is used in the practice of the invention, and FIGURE 19 is a wiring diagram of the control circuit of the airborne equipment.

The general character of the vertical control system of the invention is dictated by the specialized conditions surrounding the final approach of an aircraft to touchdown on the deck of a carrier. It has been found preferable to make all of the initial approach at a constant altitude, but for flexibility of operation it is desirable to have a range of altitude anywhere within which the system is operaable. It has also been found preferable not to make the landing a single sloping straight line, but rather to descend to an altitude of about twenty-five feet above the carrier deck, level out to establish a stable aircraft attitude, and then make the final descent. One of the advantages of this two step procedure is that it shortens the prediction time required of a deck position predictor and hence increases its accuracy. Another advantage is that it delays until the last possible moment the instant at which the aircraft is "committed" to a landing, and thus decreases the interval during which unexpected occurrences can endanger the safety of the landing.

FIGURE 1 shows the inventive system in its broadest form. Carrier based radar equipment 20 supplies to computers 21 signals 22 representative of the location of the aircraft in elevation and azimuth, and of its closing speed. Computers 21 derive from signals 22 a second set of signals 23 representative of the actual and desired location of the aircraft in elevation. These signals are supplied to the aircraft through a radio command link 24 including a transmitter 25 and a receiver 26. The outputs 27 from receiver 26 are supplied to an automatic pilot 30 where they control the aircraft.

FIGURE 2 shows the path followed by the aircraft in elevation by the line ABCDEFGHO. Portions AC and FG are straight and level. Portions DE and HO are straight, and slope at angles dependent upon the airspeed of the aircraft: the rate of descent along the first is eleven feet per second and that along the second is nine feet per second. Portions CD, EF, and GH are fairing curves. The nominal altitude of the aircraft above the deck of the carrier during the portion FG is twenty-five feet, and that during the portion AC is between one hundred thirty and one hundred ninety feet.

FIGURE 2 may be considered as a plot of altitude above the deck against time before touchdown. The line ED may be extended to some point J at a higher elevation than 200 feet. It is desired that all aircraft landing on the carrier come on to the line JE at some point D between E and J and thereafter follow the exact path DEFG. In order to accomplish this it is necessary that the aircraft begin to depart from its level flight not at the point of intersection of the level line with the line JD, but at some earlier point such that considering the aerodynamic characteristics of the aircraft it will have settled down to descend at a constant rate by the time the line JE is reached. Means for accomplishing this are supplied, and include means tentatively establishing a line D'J' parallel to DJ and spaced from it by an amount determined by the characteristics of the aircraft in question.

It will be appreciated that, since the distance $y$ of the aircraft from the touchdown point and the speed $s$ of the aircraft are both known, it is possible to compute the time $t$ remaining before touchdown from the well known relation that distance is equal to speed multiplied by time, that is $$ts = y \tag{1}$$

In other words, there is available a continuous source of information as to the length of time before touchdown, and if the desired course in elevation is laid out in units of time before touchdown rather than of distance before touchdown, the same plot can be used for all airspeeds.

FIGURE 3 is an enlarged view of the final touchdown portion of the landing path. The location of point G is determined in the following fashion. The response of a typical aircraft to a step command which orders a constant rate of descent of 9 feet per second is not instantaneous. That rate is achieved in about 2½ seconds, during which interval the aircraft has descended five feet. Consequently the time $t$ required to descend from any given height $h$ following the slope command can be computed as follows $$t = \frac{h-5}{9} + 2.5 \tag{2}$$

and, for small changes in $h$, $$\Delta t = \frac{\Delta h}{9} \tag{3}$$

For the case where the aircraft is exactly 25 feet above the carrier and the latter is at the standard elevation, the point G is located at a time $$t_n = \frac{25-5}{9} + 2.5$$

or 4.72 seconds before touchdown.

Error in the aircraft altitude and deviation of the predicted deck position from the standard elevation can both occur, and both of these factors influence the time at which the final tip signal must be given. If the carrier deck is to be lower than normal at the touchdown instant, the total time of descent is greater, and the final tip signal $G_1$ must be given at $t_1$, earlier than $t_n$, but if the carrier deck is to be higher than normal at the touchdown instant, the total time of descent is less and the final tip signal $G_2$ must be given at $t_2$, later than $t_n$. Similarly, if the aircraft is higher than normal, the total time of descent is greater and the final tip signal $G_3$ must be given at $t_3$, earlier than $t_n$, but if the aircraft is lower than normal the total time of descent is less and the final tip signal $G_4$ must be given at $t_4$, later than $t_n$. Means for making these adjustments in the time of final tip are included in the invention disclosed below.

FIGURE 4 shows the system in more detail. The carrier based precision radar 31 receives signals from its antenna 32 and automatically tracks the aircraft in azimuth by operation of the rotator 33. As suggested at 34 the precision radar is initially slaved to a marshalling radar in the overall system, to enable the precision radar to be set on a particular aircraft, but this forms no part of the present invention. Radar 31 is shown as providing an altitude output 35, a speed output 36, $y$ and $x$ outputs 37 and 40, and a "lock on" output 41 which is present whenever the radar is automatically tracking an aircraft.

Also included in the carrier based equipment is an azimuth computer 42, disclosed completely in the second application referred to above, and a vertical computer 43 which includes a vertical coordinate translator 44, a vertical signal transfer 45, a tip range computer 46, and a deck position predictor 47. The translator 44 computes, from speed output 36 and from the parallax corrected ordinate or distance signal 50 supplied through azimuth computer 42, the time $t$ remaining before touchdown. A path analog in translator 44 gives a signal representative of the scheduled altitude of the aircraft for the time $t$, and this is compared with the altitude output 35 to supply a control output 51 to signal transfer control 45 which represents the altitude error of the aircraft. Transfer 45 converts the error output 51 to a signal 52 suitable to modulate the transmitter of radio command link 24. A signal 53 representative of the actual altitude of the aircraft is also transmitted to transfer 45, and the latter gives a wave-off signal at 54 if the aircraft ever goes below a predetermined minimum before final tip altitude, or if it departs upwardly or downwardly from the scheduled path by more than a predetermined amount.

The details of predictor 47 are not material to the present invention, but for completeness one suitable predictor is described below. The predictor functions to supply at 55 a signal representative of the most probable displacement of the touchdown point from the standard elevation at the instant of touchdown. In tip range computer 46 this signal is combined with signals 56 and 57 representative of the altitude error of the aircraft and its speed, and an output 60 is supplied to translator 44, but this output is not supplied until the time before touchdown decreases to a predetermined value. For determination of this a signal 61 representative of the actual time to touchdown as computed in translator 44 is supplied to computer 46 for comparison with a fixed signal.

The azimuth control signals from computer 42 to command link 24 are suggested at 62 and 63. The portion of FIGURE 4 to the left of the broken line A—A represents carrier based equipment, while the portion of FIGURE 4 to the right of the broken line represents airborne equipment.

In the airplane the receiver of radio command link 24 supplies an altitude error signal 64 to a vertical coupler 65, and further signals 66 and 67 are supplied to coupler 65 from an altitude control 70 and an airspeed compensator 71. A wave-off signal 72 from command link 24 is also used as will be described in connection with FIGURE 19.

The automatic pilot of the aircraft, which receives signals 78 from air speed compensator 71 is shown by the general reference numeral 76 and includes sensing elements 77 giving signals to summing circuits and amplifiers indicated at 80 to actuate the control surfaces of the aircraft: the elevators 81 are controlled through a circuit 82, for example. Vertical coupler 65 supplies a pair of signals 87 and 90 which are used in the control of the elevator, as will be discussed in connection with FIGURE 15.

FIGURE 5 is a somewhat more detailed showing of the vertical coordinate translator 44. The altitude, speed, and distance signals 35, 36, and 50 are supplied to the fixed contacts 92c and 92f and 92j respectively of a relay 92 which may be energized to actuate movable contacts 92a, 92d, and 92g into engagement with the fixed contacts just named and out of normal engagement with fixed contacts 92b, 92e, and 92h, all respectively. Fixed contact 92b is connected to an initial h set device 93. Fixed contact 92e is connected to an initial s set device 94. Fixed contact 92h is connected to an initially set device 95. Devices 93, 94, and 95 are energized from a common source 96 of alternating voltage of a selected frequency.

Relay contact 92d is connected to supply a first, electrical input 97 to an electromechanical multiplier 100, having a second mechanical input on the shaft 101 of a motor 102, and having an electrical output 103. Relay contact 92g is connected to supply an input 104 to an adder 105 which has as further inputs the output 103 from multiplier 100, and the signal 60 from tip range computer 46: initially this last signal is zero.

The signal 106 of adder 105 is fed to a motor control amplifier 107 which energizes motor 102 from source 96 through a cable 110 under the control of signal 106.

As is well known, the product of speed multiplied by time is distance. Output 103 from multiplier 100 is the product of speed and shaft rotation, and is fed back to adder 105. Amplifier 107 energizes motor 102 to run until adder input 103 becomes equal to input 104. Then the product of speed and shaft rotation has been made equal to distance, and the shaft rotation is therefore time. Since the input 104 is proportional to distance of the craft from the touchdown point, the time represented by shaft 101 is time before touchdown.

Shaft 101 of motor 102 also drives a path analog 111 to give an output 112 which is a predetermined nonlinear function of shaft rotation, and is repesentative of the landing path shown in FIGURE 2. Analog 111 is energized from source 96, and is shown in more detail in FIGURE 6. It comprises first and second voltage dividers 113 and 114 including sliders 115 and 116, driven by shaft 101, and windings 117 and 120. Each winding has a total length of 357 degrees, and is tapped at each 15 degrees from 60 to 150 degrees. Thus winding 117 is tapped at 121, 122, 123, 124, 125, 126, and 127 and winding 120 is tapped at 130, 131, 132, 133, 134, 135, and 136. The windings and sliders are arranged in staggered relationship, so that when slider 16 is at the 90 degree tap on winding 120, for example, slider 115 is half way between the 75 degree and 90 degree taps on winding 117. The windings are energized in parallel from a pair of conductors 137 and 140, a fixed resistor 141 being connected in series between winding 117 and conductor 137, and a fixed resistor 142 being connected in series between winding 120 and conductor 140. Characterization of the output from the voltage dividers is accomplished by resistors shunted across the taps on the windings: resistors 143, 144, 145, 146, 147, 148, and 149 are associated with winding 117, and resistors 152, 153, 154, 155, 156, 157 and 160 with winding 120. Resistors 145, 146, 147, 155, 156, and 157 are short circuits of essentially zero resistance.

Analog 111 is energized from source 96 through a transformer 161 having a primary winding 162 and a secondary winding 163. Connected across secondary winding 163 is a series circuit made up of the fixed resistor 164, the winding 165 of a voltage divider 166 having a slider 167, and the winding 170 of a voltage divider 171 having a slider 172. The upper terminal of winding 170 is connected to conductor 137 by conductor 173. Slider 172 is adjustable by a manual knob 174 and is grounded at 175. Slider 167 is adjusted by a manual knob 176 and is connected to conductor 140 through conductors 177 and 180 and the parallel circuit 181 made up of a resistor 182 and the winding 183 of a voltage divider 184 whose slider 185 is connected to conductor 180 and is driven through a shaft 186 by a motor 187. Motor 187 has limit switches, not shown, and may be driven in either direction by a suitable electrical energization of conductors 190, 191, and 192 under the control of relay contacts 193a, 193b, and 193c and relay contacts 194a and 194c. Movable contact 193a normally engages fixed contact 193b, but may be operated to disengage contact 193b and to instead engage contact 193c. Movable contact 194a may be operated to engage fixed contact 194c. Conductor 191 is connected to fixed contact 193b and conductor 192 is connected to fixed contact 194c. Movable contact 194a is connected to fixed contact 193c by conductor 195. Movable contact 193a is connected to conductor 196, and conductors 190 and 196 are connected to source 96. Thus motor 187 is energized and operates until one of the limit switches is actuated: at this time slider 185 is at the left hand end of winding 183.

Turning again to FIGURE 5, relay contact 92a is shown as connected at 197 to a parallax corrector 200 which may be energized from source 96. The parallax corrected h output 201 from corrector 200 is supplied at 53 for transmission to the signal transfer control, and also at 202 to comprise an input to a summing amplifier 203. A second input 204 is supplied to amplifier 203 from the movable relay contact 194d, which normally engages fixed contact 194e connected to a rebalance signal device 205 energized from source 96 and adjusted through a shaft 206 by a servo 207. Fixed contact 194f, which movable contact 194d engages instead of fixed contact 194e when the relay is energized, is connected at 210 to receive the path analog output 112. Shaft 206 of servo 207 also adjusts an altitude signal device 211 energized from source 96, which supplies a first signal 212 to a comparator 213. A second signal 214 is supplied to the comparator from path analog output 112.

Comparator 213 operates to energize relay 194 whenever input 214 is less than input 212, and a suitable arrangement for accomplishing this is shown in FIGURE 7. Inputs 212 and 214 are supplied through a pair of summing resistors 215 and 216 to the input stage 217 of an amplifier 220, the last stage 221 of which has alternating plate energization from source 96. A relay 209 is in the plate circuit of the last stage. Until the signal 214 becomes less than the signal 212, the grid of output stage 221 is negative whenever the anode is positive, and no appreciable plate current flows. When signal 214 becomes less than signal 212 the grid voltage and anode voltage on stage 221 are in phase, and relay 209 is energized. As shown in FIGURE 13, this energizes relay 194.

Servo 207 of FIGURE 5 is energized with the output 51 of summing amplifier 203, through an isolating resistor 222, and is grounded at 224 when movable relay contact 479a engages fixed relay contact 479c. Thus the normal operation of servo 207 in combination with amplifier 203 is to keep devices 205 and 211 adjusted to the actual altitude of the aircraft. Until the latter comes quite near the carrier the quantity y has a large value and the H(t) output 214 from analog 111 is comparator 213 is greater than any output 212 obtainable from device 211. When the input 214 becomes less than input 212, comparator 213 energizes relay 209 and hence relay 194, and the output from path analog 111 is substituted for that from device 205 as the second input to summing amplifier 203. The latter can no longer balance itself by operation of motor 207, and the output 51 becomes the altitude error $E_h$ instead of zero.

In the right central portion of FIGURE 5 the shaft 101 of motor 102 is shown extended to drive a pair of movable contactors 225 and 226, the former with respect to a pair of fixed arcuate contacts 227 and 230 and the latter with respect to a pair of fixed arcuate contacts 231 and 232. The arcuate space between contacts 231 and 232 is occupied by a resistance winding 233 connected to the contacts and arranged to be engaged by contactor 226: the same space between contacts 227 and 230 is empty so that contactor 225 makes no contact. Conductors 234, 235 and 236 leading to elements 225, 227, and 230 are also shown in FIGURE 13. Contact 231 is grounded. Contact 232 is connected to source 96 by conductor 237. Contactor 226 is connected by conductor 240 to fixed relay contact 241b normally engaged by movable contact 241a, which may be operated to disengage contact 241b and to engage instead fixed contact 241c. Movable contact 241a supplies input 61 to tip range computer 46. Fixed contact 241c is connected by conductor 242 to source 96.

Initially $y$ is so large that $t$ computed by motor 102 and multiplier 100 results in rotation of shaft 101 to an extent which puts contactors 225 and 226 at the counterclockwise ends of contacts 227 and 232, and which puts sliders 115 and 116 at the upper ends of windings 117 and 120. As the aircraft nears the carrier $y$ decreases, so that $t$ decreases and the contactors rotate in a clockwise direction and the sliders move downwardly. Elements 227 and 232 are so dimensioned that the contactors 225 and 226 move off them at the point E, FIGURE 2, and contacts 230 and 231 are so proportioned that the contactors engage them at point G, for a landing when the aircraft is exactly 25 feet above the carrier during the portion GF and when the carrier is to be exactly at the standard elevation at touchdown. It is apparent that contactor 226 has a constant voltage until point F is reached, and that this voltage decreases linearly to zero by the time G is reached. This voltage constitutes the time-to-tip signal, for tip range computer 46, as long as relay contacts 241a and 241b are in engagement.

Tip range computer 46 has as a principle function to supply a signal 60 for modifying the instant at which the point G, FIGURE 2, occurs. Referring to FIGURE 8, computer 46 is seen to include a cathode follower 243 to which the altitude error signal $E_h$ at 56 is supplied, and from which a signal 244 is derived through a gain adjustor 245 and fed through a summing resistor 246 to summation point 247. Also supplied to point 247, through a summing resistor 250, is the deck error signal $-\Delta h$ at 55, from deck predictor 47. Summation point 247 is connected to a motor control amplifier 251. The signals are so chosen that a signal at 56 representative of a position of the aircraft above a standard 25 foot altitude has the same effect in amplifier 251 as does a signal at 55 representative of a position of the deck below the standard elevation.

Amplifier 251 energizes a motor 252, through a cable 253, and the shaft 254 of the motor adjusts a rebalance device 255 which supplies a further signal to point 247 through summing resistor 256. The position of shaft 254 is thus a measure of the total vertical distance to be traveled by the aircraft in coming to rest on the carrier, and the shaft is extended to adjust the slider 257 of a voltage divider 260 having a winding 261. Motor 252 runs to a position in which its shaft 254 has been rotated in proportion to $(E_h - \Delta h)$, which vertical distance is proportional to $\Delta t$ so that the rotation of shaft 254 is a measure of $\Delta t$.

Since $t$ is computed in the vertical coordinate translator on the basis of $y$, the correction in time required $(\Delta t)$, must be converted into terms of distance. This can be done by multiplying $\Delta t$ by $s$. To accomplish this the $s$ signal at 57 is fed through a cathode follower 262 and a gain adjuster 263 to one end of the series circuit 264 including a resistor 265, the winding 261 of voltage divider 260, a variable resistor 266, a fixed resistor 267, and a capacitor 270. Adjuster 263 is also connected to the input of an inverting amplifier 271 whose output is connected to capacitor 270. Thus the lower end of winding 261 is at a potential with respect to ground which is proportional to $+s$, and the upper end is at a potential with respect to ground which is proportional to $-s$. Proper selection of resistance values and suitable adjustment of variable resistor 266 make the two constants of proportionality the same. The motor and slider are set so that the slider is at ground potential when $E_h - \Delta h$ equals zero. Therefore movement of the slider in opposite directions gives values of $\Delta y$ of opposite sense, as is required.

The $\Delta y$ signal on slider 257 is connected to fixed relay contact 272c: fixed contact 272b is grounded, and movable relay contact 272a, which normally engages fixed contact 272b but may be operated to engage fixed contact 272c instead, is connected to supply output 60 to adder 105 of FIGURE 5.

As has been previously pointed out, the details of deck predictor 47 are not a part of the present invention. However, for completeness FIGURE 9 is presented to show schematically one form of predictor which is suitable for this use. The figure is in REAC diagram form, since this presentation emphasizes the functional characteristics of the equipment. The elements identified by numerals 273, 274, 275, 276, 277, 280, 281, 282, 283, 284, 285, and 286 are summing amplifiers with a gain of $-1$. The elements identified by numerals 287, 290, 291, 292, 293, 294, 295, 296, 297, 300, 301 and 302 are integrators having the characteristic of giving one volt per second output for a one volt input. The elements identified by numerals 303, 304, 305, 306, 307, 310, 311, 312, 313, 314, 315, 316, 317, 320, 321, 322, 323, 324, 325, 326 and 327 are voltage dividers having resistances of 30,000 ohms, and set at the following decimal fractions of full value.

| | | | |
|---|---|---|---|
| 304 | .600 | 316 | .950 |
| 305 | .120 | 317 | .336 |
| 306 | .008 | 320 | .585 |
| 307 | .065 | 321 | .071 |
| 310 | .000 | 322 | .169 |
| 311 | .070 | 323 | .902 |
| 312 | .429 | 324 | .375 |
| 313 | .826 | 325 | .331 |
| 314 | .348 | 326 | .882 |
| 315 | .942 | 327 | .465 |

Voltage divider 303 is a calibrating adjustment and is set when the equipment is installed.

The inputs to the grids of the amplifiers or integrators are through 1 megohm summing resistors, except that the input to amplifier 273 and the signals from dividers 307 and 325 are through 10 megohms, and the signals from dividers 314, 316, and 317 are through 4 megohms, as are both signals into integrator 302.

The output 55 from the predictor of FIGURE 9 has been found to represent within an error of $\pm 1$ foot the departure of the carrier deck from its standard elevation at a time 6.5 seconds subsequently.

FIGURE 10 shows signal transfer control 45 in more detail. The altitude error signal $E_h$ from coordinate translator 44 is supplied at 51, and is connected to fixed relay contact 330c. Movable relay contact 330a normally engages fixed relay contact 330b which is grounded, but may be actuated out of engagement with contact 330b and into engagement with fixed contact 330c.

Movable contact 330a is connected by conductors 331 and 332 to a bridge network 333 having input terminals 334 and 335 and output terminals 336 and 337, the latter comprising the sliders 340 and 341 of a pair of voltage dividers 342 and 343 having windings 344 and 345 which form the arms of the bridge network. Input terminals 334 and 335 are energized with alternating voltage from the secondary winding 346 of a transformer 347 whose primary winding 350 is connected to source 96. Slider 340 is adjustable by a manual zero adjuster knob 351. Slider 341 is adjusted by the shaft 352 of a motor 353, and is connected to energize an amplifier 354 through a filter 355. Amplifier 354 comprises a pair of triodes 356 and 357 which are cathode coupled by a common cathode resistor 360. The signal from filter 355 is applied to the grid of triode 356, and the signal from a velocity generator or dynamic transformer 361 driven by motor 353 through shaft 352 is applied to the grid of triode 357. The output of amplifier 354 appears at 362 and is representative of the sum of the two grid signals: it is supplied to a motor control amplifier 363 which energizes motor 353 through a cable 364 to operate in either one direction or the other, according as amplifier 363 has an input of one phase or the other. Operation of motor 353 adjusts slider 341 to unbalance bridge 333 by an amount equal and opposite to the signal 51, so that the rotation of shaft 352 is a measure of signal 51. Velocity generator 361 is energized from source 96 and supplies an antihunt signal.

A phase shifter 365 is shown as driven by shaft 352 and as having an input cable 366 and an output cable 367. This arrangement is discussed more fully in connection with FIGURE 14. The signal on cable 367 comprises output 52 shown in FIGURE 4.

Also shown in FIGURE 10 are comparators 370, 371, and 372, which are like comparator 213 of FIGURE 5. Included in comparator 370 is a relay 373 which may be energized to displace a movable contact 373a into engagement with a fixed contact 373c. Included in comparator 371 is a relay 374 which may be energized to displace a movable contact 374a into engagement with a fixed contact 374c. Included in comparator 372 is a relay 375 which may be energized to displace a movable contact 375a into engagement with a fixed contact 375c. Movable contacts 373a, 374a, and 375a are connected to a first common conductor 464, and fixed contacts 373c, 374c, and 375c are connected to a second common conductor 460, as shown in FIGURE 13. Conductors 464 and 460 comprise output 54 of signal transfer 45.

FIGURE 10 also shows by the general reference numeral 380 a source of standard voltages for comparators 370, 371, and 372, including a transformer 381 having a primary winding 382 connected to source 96 and a pair of secondary windings 383 and 384 connected in series by a grounded conductor 385 at terminals 386 and 387. Connected between terminals 386 and 390 of winding 383 is a fixed resistor 391 in series with the parallel combination of two series circuits, the first including the windings 392 and 393 of a pair of voltage dividers 394 and 395 having sliders 396 and 397, and the second including a fixed resistor 400 and the winding 401 of the voltage divider 402 having a slider 403. Connected between terminals 387 and 404 of winding 384 is a fixed resistor 405 in series with the parallel combination of two series circuits, the first including a fixed resistor 406 and a winding 407 of the voltage divider 410 having a slider 411, the second including a fixed resistor 412 and the winding 413 of a voltage divider 414 having a slider 415.

Slider 397 supplies a signal through conductor 416 to comparator 372 representative of the "floor" or minimum altitude below which the aircraft must never descend under automatic control until the point G is reached. Sliders 396 and 403 are connected by conductors 417 and 420 to fixed relay contacts 421b and 421c, the former being normally engaged by a movable relay contact 421a connected to comparator 370 by conductor 422. Sliders 411 and 415 are connected by conductors 423 and 424 to fixed relay contacts 421e and 421f, the former being normally engaged by a movable relay contact 421d, connected to comparator 371 by conductor 425. It will be evident that the signals supplied on conductors 422 and 425 are opposite in phase, and these signals represent the limits of the upward and downward aircraft deviation from the desired path. The permitted deviation of the aircraft is greater when the relay contacts are as shown, and is reduced when relay 421 is energized.

An arrangement generally similar to that just described also makes up a part of tip range computer 46, as is better shown in FIGURE 11. A comparator 426 is shown as receiving input 61, FIGURE 5, and also a standard signal 427 derived from the slider 430 of a voltage divider 431 whose winding 432 is energized, in series with a fixed resistor 433, from the secondary winding 434 of a transformer 435, the primary winding 436 of which is energized from A.C. source 96. Normally signal 61 is larger than signal 427. When signal 61 decreases to become equal to signal 427, comparator 426 energizes a relay 437, bringing movable contact 437a into engagement with a fixed contact 437c. The function performed by relay 437 will be described below.

The same sort of arrangement comprises a portion of the control system of the carrier based equipment, as is described in detail in the second copending application referred to above, and as is shown schematically in FIGURE 12. A comparator 440 is shown as receiving input 50, FIGURE 4, and also a standard signal 441 derived from a suitable device 442 energized from A.C. source 96. Initially signal 50 is greater than signal 441. When signal 50 decreases to become equal to signal 441, comparator 440 energizes a relay 443, bringing a movable contact 443a into engagement with a fixed contact 443c. The function of relay 443 will also be discussed below.

The control circuit for the carrier based equipment is shown in FIGURE 13, and is energized from A.C. source 96. When a power switch 444 is closed, power is supplied through a fuse 445 to a power bus 446, and the ground bus is shown at 447.

The winding of relay 482 is energized with signal 41 of FIGURE 4, as shown to the left of FIGURE 13.

One side of wave-off relay 450 is grounded through conductor 451: the other side may be connected to power bus 446 through five different circuits. The first circuit includes conductors 452, 453, and 454, a normally open manual wave-off switch 455 and conductor 456. The second circuit includes conductors 452, 453, and 457, normally closed relay contacts 241e and 241d, conductors 460, 461, and 462, normally open relay contacts 373c and 373a of comparator 370, conductors 463 and 464, a normally closed "ready" switch 465 and conductor 466. The third circuit includes conductors 452, 453, and 457, relay contacts 241e and 241d, conductors 460, 461, and 467, normally open relay contacts 374c and 374a of comparator 371, conductors 470, 471, and 464, ready switch 465, and conductor 466. The fourth circuit includes conductors 452, 453, and 457, relay contacts 241e and 241d, conductors 460 and 472, normally open relay contacts 375c and 375a of comparator 372, conductors 473, 474, 471, and 464, ready switch 465, and conductor 466. The fifth circuit includes conductors 452 and 475, normally open relay contacts 450c and 450a, conductors 476, 474, 471, and 464, ready switch 465, and conductor 466.

One side of a transfer start relay 477 is grounded through conductor 480. The other side may be connected to power bus 446 through conductor 481, normally open relay contacts 482c and 482a, and either conductor 483 normally open relay contacts 477a and 477c and conductor 484, or conductor 485, commutator switch 486 including a segment 487 and a contactor 490 driven by a shaft 491, and conductors 492 and 484. Shaft 491 is driven by a motor in response to radar signals, to be positioned in accordance with the distance of the aircraft from the touchdown point, and contactor 490 rotates clockwise with decreasing distance: it engages segment 487 when the distance is about 1950 yards, all as described in the second copending application referred to above.

One side of a transfer end relay 479 is grounded through conductor 478. The other side may be connected to power bus 446 through conductor 488, normally open relay contacts 477f and 477d, and conductor 489.

One side of an amber signal light 493 is grounded through conductor 494. The other side may be connected to power bus 446 through conductor 495, normally open relay contacts 450f and 450d, and conductor 496.

Stand-by relay windings 92 and 193 are connected in parallel by conductors 497 and 500. One side of the relays can be grounded through conductor 501, normally open relay contacts 443a and 443c of comparator 440, and conductor 502. The other side of the relays can be connected to power bus 446 through conductor 503, normally open relay contacts 482f and 482d, conductor 504, normally closed relay contacts 450g and 450h, and conductor 505.

One side of a rescind relay 506 is grounded through conductor 507. The other side may be connected to power bus 446 through conductor 235, segment 227 and contact 225 of a commutator switch 511, conductor 234, normally open relay contacts 193g and 193j, and conductor 517. Shaft 101 is operated by motor 102 as described in connection with FIGURE 5.

One side of a green signal lamp 520 is grounded through conductor 521. The other side is connected to power bus 446 through conductor 522, normally closed relay contacts 193e and 193d, and conductor 523.

One side of a blue signal lamp 524 is grounded through conductor 525. The other side may be connected to power bus 446 either through conductor 526, normally open relay contacts 193f and 193d, and conductor 523, or through conductors 526, 527, and 530, normally open relay contacts 194j and 194g, conductors 531 and 532, normally open relay contacts 209c and 209a of comparator 213, and conductor 533.

One side of a final tip relay 241 is grounded through conductor 534. The other side may be connected to power bus 446 through three different circuits. The first circuit includes conductor 535 and 236, segment 230 and contactor 225 of commutator switch 511, conductor 234, relay contacts 193g and 193j, and conductor 517. The second circuit includes conductors 535 and 537, normally open relay contacts 241g and 241j, conductors 540 and 527, relay contacts 193f and 193d, and conductor 523. The third circuit includes conductors 535 and 537, relay contacts 241g and 241j, conductors 540 and 530, relay contacts 194j and 194g, conductors 531 and 532, relay contacts 209c and 209a of comparator 213, and conductor 533.

A servo lock relay 541 is connected in parallel with final tip relay 241 by conductor 542 and grounded conductor 543.

One side of nose down relay 194 is grounded through conductor 544. The other side may be connected to power bus 446 either through conductors 545 and 532, relay contacts 209c and 209a of comparator 213, and conductor 533, or through conductors 545 and 531, relay contacts 194g and 194j, conductors 530 and 527, relay contacts 193f and 193d, and conductor 523.

The energizing circuit for motor 187 of FIGURE 6 appears again in FIGURE 13. The motor is shown to comprise a pair of windings 546 and 547 having a common terminal 550, grounded through conductor 190, and a pair of individual terminals 551 and 552 joined by a capacitor 553. Terminal 551 may be connected to power bus 446 through conductor 554, a normally closed limit switch 555, conductor 191, normally closed relay contacts 193b and 193a, and conductor 196. Terminal 552 may be connected to power bus 446 through conductor 556, normally closed limit switch 557, conductor 192, normally open relay contacts 194c and 194a, conductor 195, relay contacts 193c and 193a, and conductor 196.

One side of a precision relay 330 is grounded through conductor 560. The other end may be connected to power bus 446 through conductor 561, normally open relay contacts 447n and 477k, and conductor 562.

One side of an error limits relay 421 is grounded through conductor 564. The other side may be connected to power bus 446 through conductor 565, normally closed relay contacts 506b and 506a, and conductor 566.

One side of a Δy relay 292 is grounded through conductor 567. The other side may be connected to power bus 446 either through conductors 570 and 571, normally open relay contacts 437c and 437a of comparator 426, and conductor 572, or through conductor 570, normally open relay contacts 272f and 272d, conductor 573, normally open relay contacts 193k and 193n, and conductor 574.

FIGURE 14 is a schematic showing of the radio command link 24 in considerable functional detail. Transmitter 25 appears at the left of the figure and receiver 26 appears at the right. In the transmitter a 90 cycle generator 575 is shown as supplying a first output 576 to a first modulated oscillator 577, and a further output 366 to phase shifter 365. Phase shifter 365 has already been discussed in connection with signal transfer control 45 of FIGURE 10, and is shown to be adjusted by motor shaft 352. The output of the phase shifter is a 90 cycle alternating voltage whose phase relative to that supplied by generator 575 is representative of the rotation of the phase shifter shaft, that is, of the vertical error of the aircraft for phase shifter 365. This output 367 is supplied to a further modulated oscillator 580, and the oscillators supply, to a mixer 581, modulated outputs 582 and 583, all respectively.

In order that the various signals may later be separated, the oscillators operate at distinguishable frequencies. While any suitable modulating arrangement may be used, it has been satisfactory in practice for oscillators 577 and 580 to be phase shift modulated at a shift frequency of 90 cycles per second, the 90 cycle modulating voltage being shifted in phase proportional to the operation of shaft 352 and phase shifter 365. In the embodiment of the invention referred to above the frequency of modulated oscillator 577 shifts between 19.7 and 20.2 kilocycles per second, and that of oscillator 580 shifts between 14.1 and 14.6 kilocycles per second.

FIGURE 14 shows a plurality of keyed oscillators 584, 585, 586, and 587. Each of these oscillators operates at one of two frequencies accordingly as a control circuit for the oscillator is open or closed. The control circuits of these oscillators are controlled by the operation of certain relays, the windings of which are energized as shown in figures previously described. Thus oscillator 584 operates at a first frequency unless relay contacts 450k and 450n are in engagement. Oscillator 585 operates at a first frequency unless both relay contacts 477g and 477j and relay contacts 479d and 479e are in engagement. Oscillator 586 operates at a first frequency unless both relay contacts 506d and 506f and relay contacts 194k and 194n are in engagement. Oscillator 587 operates at a first frequency unless relay contacts 241k and 241n are in engagement.

The frequencies of oscillators 584, 585, 586, and 587 are mutually distinguishable, and are also distinguishable from the frequencies of oscillators 577 and 580: oscillator 584 operates at 2.9 or 3.1 kilocycles per second, oscillator 585 at 3.9 or 4.1 kilocycles per second, oscillator 586 operates at 4.9 or 5.1 kilocycles per second, and oscillator 587 operates at 5.4 or 5.6 kilocycles per second, in the embodiment of the invention found satisfactory.

A mixer 590 is connected to receive the signals 591, 592, 593, and 594 from oscillators 584, 586, 587, and 590, respectively.

Mixers 581 and 590 may include such isolation stages as are required to prevent interaction between the various signals supplied thereto: their outputs 595 and 596 are supplied to a further mixer and amplifier 597 which supplies to a further modulator 600 an input 601 which includes both the proportional signals and all the keyed signals. Modulator 600 supplies a signal 602 to and may comprise a part of transmitter 603, and there is radiated from the antenna 604 a radio frequency carrier, phase modulated with the intelligence to be transmitted. In one form of the invention a carrier frequency of 235.4 megacycles per second was found satisfactory.

This completes the description of the carrier based portion of the apparatus. In the aircraft the carrier is picked up by receiving antenna 605 and supplied to receiver 606 which amplifies it and demodulates it to remove the carrier. Reception of a signal at an acceptable level supplies an output from receiver 606 along a conductor 607 to operate a switching device 608, the relay contacts 610a and 610c of which also appear in FIGURE 19. The complex audio signal is supplied at 611 to an amplifier 612. The output 613 of amplifier 612 contains the proportional and switching information in the form of signals of different frequencies, and is supplied to a plurality of sharply tuned band pass filters 614, 615, 616, 617, 620 and 621. Filter 614 passes frequencies in a narrow band centered at about 19.95 kilocycles per second and supplies a signal 622 determined by the reference signal 576 and comprising a 90 cycle voltage of fixed phase.

Filter 615 passes frequencies in a narrow band centered at 14.35 kilocycles per second, and its output 623 is supplied to a phase detector 624 with the signal 622 from filter 614. The output 625 from detector 624 is a direct voltage which varies in magnitude and reverses in polarity with the amount and direction of the displacement of phase shifter 365: it comprises output 64 of FIGURE 4.

Filter 616 passes frequencies in a narrow band centered at about 3.0 kilocycles per second and its output 626 is supplied to a detector 627 which energizes the winding of a relay 630 having normally closed contacts 630a and 630b which open when oscillator 584 is keyed. The condition of relay contacts 630a and 630b comprises signal 72 of FIGURE 4.

Filter 617 passes frequencies in the narrow band centered at about 4.0 kilocycles per second and its output 631 is supplied to a detector 632 which energizes the winding of a relay 633 having normally open contacts 633a and 633c which close when oscillator 585 is keyed.

Filter 620 passes frequencies in a narrow band centered at 5.0 kilocycles per second, and its output at 634 is supplied to a detector 635 which energizes a relay 636 having normally open contacts 636a and 636c which close when oscillator 586 is keyed.

Filter 621 passes frequencies in a narrow band centered at 5.5 kilocycles per second, and its output 637 is supplied through a detector 640 which energizes the winding of a relay 641 having normally open contacts 641a and 641c which close when oscillator 587 is keyed.

FIGURE 15, to which reference should now be made, shows the vertical control portion of the airborne equipment. An elevator servomotor 642 is shown as supplying a mechanical output 643 for adjusting the elevators of the aircraft. An elevator position signal device 646 is adjusted simultaneously with the elevators.

Motor 642 is energized through a cable 647 by a servo amplifier 650, as will be shown in detail in connection with FIGURE 19. Servo amplifier 650 is energized at 651 from a D.C. amplifier 652, energized in turn from a summation point 653 through conductor 654, network 655 and conductor 656.

The output of elevator position signal device 646 is supplied by conductor 657, capacitor 660, and summing resistor 661 to summation terminal 653.

A pitch rate gyroscope supplies an electric signal to the winding 662 of a voltage divider 663 whose slider 664 is connected by capacitor 665 and summing resistor 666 to terminal 653. A characterizing resistor 667 is connected between slider 664 and winding 662 to give the output of voltage divider 663 a desired nonlinearity.

A complex signal is supplied to summation point 653 through conductor 670 from the slider 671 of a voltage divider 672 whose winding 673 is energized from a second summation point 674.

Servo amplifier 650 is shown as also energizing a centering motor 675 through a cable 676: as will be described in connection with FIGURE 19, centering motor 675 is energized alternatively with servomotor 642. Motor 675 adjusts a pitch command signal device 677 through a mechanical connection 680 including a suitable gear train 681, and connection 680 is extended to carry a manual pitch centering knob 682. Pitch command signal device 677 is connected to supply a signal through conductor 683 and summing resistor 684 to summation point 674.

Further input voltages are supplied to summation point 674 through summing resistors 685 and 686 from a vertical gyroscope, to comprise pitch angle and up-elevator signals, respectively. A further input to summation point 674 may be supplied through a summing resistor 687, which is either zero or that of a fixed voltage source 690, according as a movable relay contact 691a engages a first contact 691b or a second fixed contact 691c. The energizing circuit for relay 691 will be described in connection with FIGURE 19.

Two further input voltages are supplied to summation point 674 through summing resistors 692 and 693 from vertical coupler 65 which is shown to comprise a pair of output devices 694 and 695 adjusted by servomotors 696 and 697 through mechanical connections 700 and 701, all respectively. Device 694 supplies a first output on conductor 702 to summing resistor 692, and a second output on conductor 703. Device 695 supplies a first output on conductor 704 to summing resistor 693, and a second output on conductor 705. When the coupler is not engaged the first outputs of devices 694 and 695 become zero.

Servomotor 696 is energized through a cable 706 from a motor control amplifier 707 having a first input 710 and a second input 711. Input 710 is derived from conductor 703 through a differentiator 712, to comprise a rate feedback, so that elements 696, 707, 710, and 712 comprise an integrator. Similarly, servomotor 697 is energized through a cable 713 from a motor control amplifier 714 having output 705 as a first or feedback input, and having a second input 715. Inputs 711 and 715 are derived through an isolation network 716, a connection 717, a compensating network 720, and a conductor 721 from the slider 722 of a voltage divider 723 whose winding 724 is connected by conductor 725 to a movable relay contact 726a, which normally engages a first fixed contact 726b but may be moved into engagement with a second fixed contact 726c. Contact 726c is connected to conductor 625, FIGURE 14, to supply signal 64 representative of the vertical error of the aircraft as determined by the carrier based apparatus. Contact 726b is connected to receive the signal 66 from the altitude control 70 of the aircraft which signal is representative of the altitude error of the aircraft.

From the foregoing it will be evident that the input to network 655 is the sum of signals representative of the rates of change of elevator position and of pitch attitude, and of pitch command, flap position, and pitch attitude, together with an up elevator signal and, if vertical coupler 65 is engaged, signals representative of the vertical error of the aircraft and its integral based on either radar data or on altitude control data.

Whereas the signals in the carrier based equipment are preferably alternating voltages, those in the airborne equipment are preferably direct voltages, and may be derived from any suitable source.

Sliders 664, 671, and 722 are shown as actuated by a mechanical connection 727, which is operated in accordance with the airspeed of the aircraft. The airspeed ratio control system which performs this adjustment is illustrated in FIGURE 16, to which reference should now be made.

In FIGURE 16 an airspeed sensor 730, which may be a differential air pressure responsive bellows system, acts through a mechanical connection 731 to displace the slider 732 of a voltage divider 733 with respect to the winding 734. The winding is connected, in series with fixed resistors 735 and 736, across the secondary winding 737 of a transformer 740 whose primary winding 741 is energized from an airborne source 742 of alternating voltage, normally 400 cycles. A characterizing resistor 743 is connected between slider 732 and the junction point 748 between resistor 735 and 736.

Also connected across secondary winding 737 is the winding 744 of a voltage divider 745 having a slider 746 connected by a conductor 747 to the input of a motor control amplifier 750. Slider 746 is adjusted through mechanical connection 727 by a servomotor 751 energized through a cable 752 from amplifier 750.

Mechanical connection 727 is extended to drive a velocity generator 753 having a primary winding energized from source 742. Velocity generator 753 functions to supply an output between conductor 754 and ground which varies in amplitude with the speed of motor 751, and which reverses in phase with reversal of the motor. Conductor 754 is connected through a network including a capacitor 755 and a resistor 756 to the winding 757 of a voltage divider 760 having a slider 761 connected by conductor 762 to junction point 748. Mechanical connection 727 is further extended to actuate sliders 664, 671, and 722 as is shown in FIGURE 15.

As shown in FIGURE 16, the elements having numbers between 732 and 746 make up an A.C. bridge 763 whose input terminals are the terminals of the secondary winding 737, and whose output terminals are slider 746 and junction point 748. Operation of motor 751 adjusts two adjacent arms of the bridge equally and oppositely, and operation of airspeed sensor 730 adjusts the resistance of a third arm of the bridge relative to the fixed resistance 736 of the fourth arm of the bridge.

It will be appreciated that the unbalance voltage from bridge 763 resulting from linear response by sensor 730 is nonlinear, and that the amount of adjustment of slider 746 by motor 751 must accordingly be nonlinear. This means that the outputs on sliders 664, 671, and 722 of FIGURE 15 are nonlinear with variation of sensor 730 even though the windings of the voltage dividers are themselves linear. As concerns the output of slider 664, there is the further condition that by reason of loading resistor 667 the voltage output is still further characterized. By this method of double loading an output is obtained which is more heavily characterized than would be possible by loading a single voltage divider, and yet recourse to graded windings or other costly expedients is avoided.

Reference should now be made to FIGURE 17, which shows altitude control 70 in more detail. A force balance 763 is subject to a first mechanical input 764 from an altitude sensor 765, and to a second mechanical input supplied by the shaft 766 of a servomotor 767, which also drives a velocity generator 770 and may further act, through a normally disengaged clutch 771 having an engaging solenoid 772, to adjust a spring centered output device 773. Velocity generator 770 is like generator 753 in FIGURE 16, and supplies an anti-hunt signal on cable 774 to a motor control amplifier 775 which energizes servomotor 767 through a cable 776. The signal input to motor control amplifier 775 is supplied from force balance 763 through cable 777. In the operation of the system motor 767 continually runs to maintain balance as the input 764 varies with altitude, so that shaft 766 continues to represent by its position the altitude of the craft. As long as clutch 771 is disengaged, device 773 is spring centered and no output appears on conductor 780, which corresponds to 66 of FIGURE 4. When clutch 771 is engaged, motor 767 drives device 773, which thereafter gives on conductor 780 a D.C. voltage representative of any departure of the aircraft from the altitude at which the clutch was engaged.

Referring now to FIGURE 18, the vertical coupler is shown as receiving D.C. inputs between conductors 625 (FIGURE 14) and 780 (FIGURE 17) and ground, representative respectively of the vertical path error 64 and altitude error 66 of the aircraft, and as supplying outputs between conductors 702 and 704 (FIGURE 15) and ground. The coupler includes a proportional channel 781 and an integrating channel 782.

In the proportioning channel servomotor 697 is energized through cable 713 from motor control amplifier 714. By mechanical connection 701 motor 697 actuates a velocity generator 783 which supplies an anti-hunt signal to amplifier 714 through a cable 784. Mechanical connection 701 is extended to actuate the slider 785 of a voltage divider 786 whose winding 787 is energized with equal unidirectional voltages of opposite polarity with respect to ground. Voltage divider 786 is a part of proportional output network 695, which further includes a fixed voltage divider made up of resistors 791 and 792, and an output circuit including relay contacts 793c, 793a, and 793b, by means of which conductor 704 is either grounded or supplied with the output of channel 781.

Inputs are supplied to amplifier 714 through a plurality of summing resistors 794, 795, 796, and 797. Summing resistor 794 is a part of a feedback network 800 which also includes a fixed voltage divider made up of resistors 801 and 802 and a variable voltage divider 803 whose winding 804 is energized with equal unidirectional voltages of opposite polarity with respect to ground, and whose slider 805 is driven by motor 697 through mechanical connection 701.

Summing resistor 795 is a part of a centering network 806 which also includes a fixed voltage divider made up of resistors 807 and 810 and a variable voltage divider 811 whose winding 812 is energized by equal unidirectional voltages of opposite polarities with respect to ground and whose slider 813 is adjustable by a manual knob 814.

Summing resistor 796 is a part of a nose-down signal network 815 which also includes a fixed voltage divider made up of resistors 816, 817, and 820, connected between ground and a source of unidirectional negative voltage, normally open relay contacts 819c and 819a, and normally open relay contacts 821c and 821a.

Summing resistor 797 is a part of isolation network 716 which also includes resistors 822, 823, and 824, filter capacitors 825, 826 and 827, a further summing resistor 830, and an input terminal 831 to which is applied to the signal from an input network 720. Network 720 includes normally open relay contacts 832a and 832c, resistors 833, 834, 835, 836, and 837, and capacitors 840 and 841 and is energized from the slider 722 of voltage divider 723, whose winding 724 is energized either with the signal on conductor 625, through isolating resistor 843, or with the signal on conductor 780, through isolating resistor 842, according as relay contacts 726a, 726b, and 726c are in operated or normal condition.

In integrating channel 782 of the vertical coupler servomotor 696 is energized through cable 706 from motor control amplifier 707. By mechanical connection 700 motor 696 actuates a velocity generator 844 which supplies an antihunt signal to amplifier 707 through a cable 845. Mechanical connection 700 is extended to actuate the slider 846 of a voltage divider 847 whose winding 850 is energized with equal unidirectional voltages of opposite polarity with respect to ground. Voltage divider 847 is a part of integral output network 694 which also includes a fixed voltage divider made up of resistors 852 and 853 and an output switching circuit including relay contacts 793d, 793e, and 793f, by means of which conductor 702 is either grounded or supplied with the output of channel 782.

Inputs are supplied to amplifier 707 through a plurality of summing resistors 854, 855, and 830. Resistor 830 is a part of isolation network 716 as previously described. Resistor 854 is a part of a rate feedback network, which includes relay contacts 793g, 793h, and 793j, normally closed relay contacts 793k and 793m, normally closed relay contacts 726d and 726e, one or both of differentiating capacitors 857 and 860, isolating resistor 861, a fixed voltage divider made up of resistors 862, 863, and 864, and supplying positive voltages with respect to ground, and a variable voltage divider 865 having a slider 866 and a winding 867 energized with equal unidirectional voltages of opposite polarity with respect to ground.

Summing resistor 855 comprises part of a heading network 870 which also includes a fixed voltage divider made up of resistors 871 and 872, a summing resistor 873, normally open relay contacts 832d and 832f, and a voltage divider 874 having a winding 875 energized with equal unidirectional voltages of opposite polarities with respect to ground and a slider 876 adjusted by a manual knob 877.

FIGURE 19 shows the control circuit for the airborne equipment. Only the details of the vertical control of the aircraft are included, since the azimuth control circuitry has been covered completely in the second copending application referred to above. Extending across the bottom of the figure is a ground bus 880. In the upper left hand corner of the figure the D.C. source for the aircraft is shown at 881: when a first circuit breaker 882 is closed the 400 cycle alternater 883 of the aircraft is energized through conductors 884, 885, and 886 and ground conductors 887 and 890. Alternator 883 supplies alternating voltage 742 as previously described. When a second circuit breaker 891 is closed source 881 is connected to a power bus 892.

Servomotor 642 is a series D.C. motor and has forward and reverse windings, with a common ground conductor 893 and separate input conductors 894 and 895. The circuit for forward operation of the motor may be completed to bus 892 through conductor 894, normally open relay contacts 896c and 896a, conductor 897, normally open relay contacts 900c and 900a in servo amplifier 650, and conductor 901. The circuit for reverse operation of motor 642 may be completed to bus 892 through conductor 895, normally open relay contacts 896f and 896d, conductor 902, normally open relay contacts 907c and 907a in servo amplifier 650, and conductors 903 and 901.

Centering motor 675 is a reversible D.C. motor and reverses with reversal in the polarity of voltage applied across input conductors 904 and 905. The circuit for forward operation of the motor may be completed from bus 892 through conductor 901, relay contacts 900a and 900c, conductor 897, normally closed relay contacts 896a and 896b, conductors 906 and 904, motor 675, conductor 905, resistor 910, conductor 911, anti-engage relay winding 912 and conductor 913 to ground bus 880. The circuit for reverse operation of the centering motor may be traced from bus 892 through conductors 901 and 903, relay contacts 907a and 907c, conductor 902, normally closed relay contacts 896d and 896e, conductor 905, motor 675, conductor 904, resistor 914, conductor 911, relay winding 912 and conductor 913 to ground bus 880.

Bus 892 is connected through the normally closed relay contacts 912a and 912b to a conductor 915.

One end of a ready relay 916 is grounded through conductor 917. The other end may be connected to conductor 915 through conductor 920, normally open relay contacts 610c and 610a, conductor 921, normally closed relay contacts 630b and 630a, and conductor 922.

One end of a wave-off relay 923 is grounded through conductor 924. The other end may be connected to conductor 915 either through conductors 925 and 926, normally open relay contacts 923c and 923a and conductor 927, or through conductor 925, normally closed relay contacts 916b and 916a, conductor 930, normally open relay contacts 931c and 931a and conductor 932. In parallel with wave-off relay 923 is a circuit including conductor 932, a flasher 933, conductor 934, a wave-off lamp 935, and conductor 936.

One side of a transfer period relay 832 is grounded through conductor 937. The other side may be connected to conductor 915 through conductor 940, normally open relay contacts 633c and 633a, conductor 941, normally open relay contacts 931f and 931d, and conductor 929.

One side of an indicator 942 is grounded at 943. The other side may be connected by conductor 944, resistor 945, and conductor 946 to a terminal 947 which may be energized from conductor 915 through either of two paths. The first path includes conductor 950, normally open relay contacts 726j and 726g, conductors 951 and 941, relay contacts 931f and 931d and conductor 929. The second path includes relay contacts 832j and 832g, conductors 952, 951, and 941, relay contacts 931f, and 931d and conductor 929.

One side of a precision relay 726 is grounded through conductor 953. The other side is connected to terminal 947 through conductors 954 and 955.

One side of glide path relay 821 is grounded through conductor 956. The other side is connected to terminal 947 through conductor 957, normally open relay contacts 636c and 636a, and conductors 960 and 955.

One side of final tip relay 819 is grounded through conductor 961. The other side is connected to terminal 947 through conductor 962, normally open relay contacts 641c and 641a, and conductors 963, 960, and 955.

A circuit may be completed from conductor 915 through the contacts 964a and 964c of an automatic pilot switch, conductor 965, normally closed release switch 966, conductor 967, winding 964 of the switch, conductor 970, normally closed relay contacts 923d and 923e, and conductor 971 to ground bus 880. A manual knob 972 is arranged for displacing contact 964a with respect to contact 964c through a mechanical connection 973. The arrangement is such that unless the winding 964 of the switch is energized, contact 964a will not remain in engagement with contact 964c.

One side of an elevator engage relay 896 is grounded through conductor 974. The other side is connected to switch contact 964c through conductor 975.

A circuit can be traced from relay contact 964c through conductor 976, contacts 977a and 977c of an altitude control switch having a winding 977, the winding, normally closed relay contacts 726k and 726m, and conductor 980 to ground bus 880. A manual knob 981 is arranged for displacing contact 977a with respect to contact 977c. The arrangement is such that unless the winding 977 is energized contact 977a will not remain in engagement with contact 977c.

One side of altitude control engage solenoid 772 is grounded through conductor 981. The other side may be connected to conductors 976 through conductor 982 and 987 and switch contacts 977c and 977a.

One side of a vertical coupler relay winding 793 is grounded through conductor 983. The other side may be connected to conductor 976 through three paths. The first path includes conductors 984, 985, and 986, normally closed relay contacts 796p and 796q, conductor 987 and switch contacts 977c and 977a. The second path includes conductors 984 and 985, normally open relay contacts 832n and 832k, and conductor 990. The third path includes conductor 984, normally open relay contacts 726u and 726s, and conductors 991 and 990. It will be noted that these three paths have a common terminal 992.

A circuit may be completed from terminal 992 through conductor 993, contacts 994a and 994c of an automatic carrier control amplifier switch having a winding 994, conductor 1001, the winding, normally closed relay contacts 923d and 923e, and conductor 971 to ground bus 880. A manual knob 995 is arranged for displacing contact 994a with respect to contact 994c through mechanical connection 996. The arrangement is such that unless the winding 994 is energized the contacts will not hold in.

One side of ACCA relay winding 931 is grounded through conductor 997. The other side may be connected to terminal 992 through conductors 1000 and 1001, switch contacts 994c and 994a, and conductor 993.

One side of a flap relay 691 is grounded through conductor 1002. The other side may be connected to conductor 892 through conductor 1003, flap switch 1004, and conductor 1005.

Operation

In describing the operation of this system, it is to be understood that the apparatus described is a portion of a complete system having components not illustrated herein for controlling the aircraft in azimuth. Some of the expedients resorted to herein are influenced by this fact, which also explains the occasional appearance of apparently unnecessary complexity. The initial condition of the system is as shown in the figures of the drawing, and operation will be traced from a starting point where the aircraft is airborne but is remote from the carrier, and has its flaps retracted.

The human pilot's first action is to close circuit breaker 882, FIGURE 19, to start inverter 883, and circuit breaker 891 may be closed at the same time. Alternating voltage is supplied to the airspeed compensator of FIGURE 16, the vertical coupler of FIGURE 18, and the altitude control of FIGURE 17. The human pilot also energizes the receiver 26 of the radio command link. In practice it is found desirable to supply direct current for the sensors of the automatic pilot, FIGURE 15, for altitude control output device 773 of FIGURE 17, and for the signal sources of FIGURE 18 by rectification and filtering from inverter 883, since electronic regulation is thereby made possible, but any other suitable D.C. energization can be supplied.

At this time the aircraft has some particular airspeed, and slider 732 of FIGURE 16 is accordingly at some particular position on winding 734. If bridge 763 is not balanced a signal is supplied to amplifier 750, and operation of motor 751 results to readjust slider 746 to a position at which the bridge is balanced. At the same time sliders 664, 671, and 722 of FIGURE 15 are adjusted so that their positions are proportional to the airspeed of the aircraft.

Also at this time force balance 765 of FIGURE 17 is being acted upon by sensor 765, and any unbalance results in the operation of motor 767 to restore balance and to position shaft 766. Clutch 772 is de-energized, however, so device 773 remains spring centered and no output is supplied at 66 to the automatic pilot through the vertical coupler of FIGURE 18.

Similarly, output devices 694 and 695 are supplying no signals to the automatic pilot, since, as shown in FIGURE 18, these devices are grounded.

It is customary for the human pilot to maintain the aircraft in a standard wing-level, constant-altitude flight at this time. The pitch rate, pitch angle and up elevator signals through resistors 666, 685, and 686 are thus all zero, and since the elevators are not being changed the signal through resistor 661 is also zero. Accordingly the only signal is that supplied by pitch command device 677, which remains where it was last set: this signal is transmitted to amplifier 650 through summing resistor 684, voltage divider 672—wherein it is modified in proportion to airspeed—and network 655.

When circuit breaker 891 of FIGURE 19 is closed, servo amplifier 650 energizes centering motor 675 through relay contacts 900a and 900c or relay contacts 907a and 907c, depending on the sense of the pitch command signal. Centering motor 675 operates to reduce the pitch command signal to zero, thereby de-energizing the amplifier and causing the relay contacts to drop out.

If the aircraft is not in the standard attitude one or more of the signals through summing resistor 661, 666, 685, and 686 is not zero, and motor 675 operates to make the pitch command signal through resistor 684 equal and opposite to the sum of the other signals. This same result occurs if any condition changes after the automatic pilot has been centered.

It is to be noted (FIGURE 19) that at any time when centered motor 675 is being energized, relay 912 is also being energized. This opens the normally closed relay contacts 912a and 912b and prevents any operation of the control system as long as the automatic pilot is unbalanced.

The normal condition of vertical coupler 65 is shown in FIGURE 18. No input signal from the altitude control output device is supplied at 780. If slider 866 is not at the center of winding 867, current flows through resistors 863 and 864, producing a voltage across resistor 864 of one polarity or the other dependent upon the direction of displacement of the slider, and a constant positive voltage is additionally maintained across resistor 864 by voltage divider action of resistors 862, 863, and 864. The sum of these two voltages is supplied to amplifier 707 through summing resistor 854, and a centering voltage from slider 876 is supplied to amplifier 707 through summing resistor 855. These are the only inputs to the amplifier, and motor 696 runs to adjust slider 866 until the amplifier input is zero. At this time the lefthand electrodes of capacitors 857 and 860 are grounded, and the capacitors are accordingly charged to the voltage between slider 866 and ground, but there is no feedback circuit through the capacitors and hence no integrating action.

If slider 805 is not at the center of winding 804, a voltage is supplied to amplifier 714 through summing resistor 794, and a centering voltage is applied to amplifier 714, through summing resistor 795, from slider 813. Motor 697 runs to adjust slider 805 until the amplifier input is zero.

By the foregoing, sliders 846 and 785 are brought to desired initial positions on their windings, to give output voltages at relay contacts 793c and 793f of desired magnitude.

The human pilot next closes automatic pilot switch 964 by knob 972. If the automatic pilot is centered the holding circuit for the switch is completed through relay contacts 912a and 912c and relay contacts 923d and 923e, and the switch contacts 964a and 964c are held in. The circuit for elevator engage relay 896 is now completed, and amplifier 650 is connected to servomotor 642 instead of to centering motor 675. Relay 912 is now out of the motor circuit, and contacts 912a and 912b cannot open the control circuit.

The human pilot now closes altitude control switch 977 by knob 981. The holding circuit for the switch is completed through relay contact 912a and 912b, conductor 915, switch contacts 964a and 964c, conductor 976, switch contacts 977a and 977c, and relay contacts 726k and 726m, and the switch contacts 977a and 977c are held in. Two results follow: in the first place altitude engage solenoid 772 is energized, and in the second place relay 793 is energized through relay contacts 726p and 726q. Energization of solenoid 772 connects device 723, FIGURE 17, to shaft 766, and any subsequent change in the altitude of the aircraft supplies a signal at 780 to FIGURE 18. This signal is modified in accordance with air-speed at 723 and the modified signal is supplied to terminal 831 through the resistance capacitance network including resistors 834, 835, 836, and 837, and capacitors 840 and 841. From terminal 831 the signal is supplied to amplifier 707 through summing resistor 830 and rotating resolver 824.

Operation of relay 793 ungrounds capacitors 857 and 860, at contacts 793k and 793m, and connects them to summing resistor 854 at contacts 793g and 793j, opening the circuit from resistor 854 to resistor 864 at contacts 793g and 793h. Between the right hand terminals of capacitors 857 and 860 and ground is now the parallel sum of the fixed voltage drop across resistor 863 and 864 and the voltage between slider 866 and ground: any change in the latter is transmitted through the capacitors to constitute a rate feedback, thus giving the amplifier the properties of an integrator. Slider 846 is positioned in accordance with the same integral of altitude control signal 66.

The signal at 831 is also fed through isolating resistors 823 and 822 and summing resistor 797 to comprise a further input to amplifier 714. Motor 697 is accordingly operated to position slider 785 in accordance with the altitude error signal 66.

Energization of relay 793 also acts at contacts 793a and 193d to unground conductors 704 and 702 and connect them to sliders 785 and 846, so that signals are supplied to the automatic pilot, FIGURE 15, through summing resistors 693 and 692 to modify the elevator settings in accordance with altitude error, and integral thereof, to thereby control the aircraft so that it flies at a constant altitude.

The human pilot now awaits signals from the carrier. At the carrier the radar equipment is turned on, as is the A.C. source 96.

FIGURE 5 shows that an arbitrary initial $y$ set signal is supplied to adder 105 from device 95 and that it is combined with a signal at 103 from multiplier 100. At this time the signal at 60 is zero because of relay 272 (FIGURE 8). An arbitrary initial $s$ set signal from device 94 is supplied to multiplier 100, and amplifier 107 causes operation of motor 102 to adjust multiplier 100 until the signal at 103 is equal and opposite to the signal at 104. Then the rotation of shaft 101 is a measure of $t$ computed on the initial set values of $s$ and $y$. Operation of motor 102 also adjusts analog 111 to give an output $H(t)$ representative of the scheduled elevation of the aircraft at the time $t$ before touchdown, and this output is supplied to comparator 213.

An arbitrary initial $h$ set signal is supplied from device 93 through parallax corrector 200 to summing amplifier 203 and is combined with the output of device 205: servo 207 operates until the two inputs are equal, when the output 51 is zero and the rotation of shaft 206 is a measure of the $h$ setting. Device 211 is set simultaneously to supply input 212 to comparator 213: the initial set values are selected so that input 212 is greater than input 214 and relay 194 remains de-energized, and so that the $t$ computed by the operation of motor 102 is such that contactors 225 and 226 are at the counter-clockwise extremes of their travel, as shown.

FIGURES 5 and 8 show that the altitude error and deck error inputs to amplifier 251 through summing resistors 246 and 250 are opposed by a rebalance input through resistor 256, and motor 252 is driven until the amplifier input becomes zero. When this happens the rotated position of the motor is a measure of $E_h - \Delta h$ ($E_h$ being presently zero), which vertical distance at a constant rate of descent is proportional to time. Slider 257 is thus adjusted in accordance with time, and since winding 261 is energized in accordance with horizontal speed, the output on contact 272c is a measure of horizontal distance. Relay contacts 272a and 272c are open to cut off this signal from adder 105, FIGURE 5.

Slider 336 of FIGURE 10 is grounded at relay contact 330b. If slider 341 is not at the position on winding 345 which corresponds to the setting of slider 340, motor 353 operates to adjust slider 341 to bring this about: slider 340 is set so that when motor 352 stops operating the output 367 from phase shifter 365 is in phase with the input 366.

Referring now to FIGURE 13, switch 444 is representative of all the switching relays necessary to establish an initial or marshalling phase of supervision of the landing from the carrier, as is described in greater detail in the copending application referred to. During this marshalling phase the aircraft is controlled in elevation by the altitude control. When switch 444 is closed, green lamp 520 is illuminated, and motor 187 runs until limit switch 555 opens. Relay 421 pulls in, acting as shown in FIGURE 10 to select the lower set of standard values for comparators 370 and 371. The radio command link transmitter is turned on, and when a reliable signal is being received at the aircraft, relay 610, FIGURE 14, engages its contacts 610a and 610c. FIGURE 19 shows that this energizes ready relay 916, and its contacts 916a and 916b open to interrupt the circuit from wave off relay 923 to relay contact 931c.

In preparation for the final approach, the human pilot lowers the landing gear and flaps of the aircraft. Lowering the flaps closes switch 1004, FIGURE 19, energizing relay 691. This acts through contacts 691a, 691b, and 691c, in FIGURE 15, to add to the signals supplied to terminal 674 a further signal from source 690, which is sufficient to produce an elevator adjustment compensating for the change in lift consequent on lowering the flaps.

The human pilot also closes ACCA switch 994 by means of knob 945. The holding circuit for this relay is completed to ground through relay contacts 923d and 923e, and to conductor 915 through relay contacts 726p and 726q, switch contacts 977c and 977a, and switch contacts 964c and 964a, so that the switch remains closed. Relay 931 is now energized: contacts 931a and 931c close to complete a preparatory circuit for wave off relay 923, and relay contacts 931d and 931f complete a preparatory circuit for relays 832, 726, 821, and 819, and indicator 942.

The carrier operator controls the equipment to track the aircraft, and when automatic tracking is established the radar supplies lock-on signal 41 which energizes relay winding 482, FIGURE 12. This completes a preparatory circuit for relay 477, at relay contacts 482a and 482c, and energizes standby relays 92 and 193 through relay contacts 482d and 482f. Relay 92 acts to substitute actual values of $h$, $s$, and $y$ for the initial set values, as shown in FIGURE 5.

Relay 193 acts at contacts 193d, 193e and 193f, FIGURE 13, to de-energize green lamp 520 and energize blue lamp 524. It completes a preparatory circuit for $\Delta y$ relay 272 at 193k and 193n, and completes an energizing circuit for commutator switch 511 at contacts 193g and 193j. At this time contactor 225 engages segment 227 and relay 506 is energized: relay 421 is de-energized at contacts 506a and 506b so that the higher set of standard values is selected for comparators 371 and 370, FIGURE 10. A preparatory circuit for keying oscillator 586, FIGURE 14, is completed at relay contacts 506d and 506f.

As pointed out in the copending application, shaft 491 of FIGURE 13 is driven in accordance with the distance of the aircraft from the touchdown point, and at a distance of about 950 yards contactor 490 engages segment 487. Since relay contacts 482a and 482c are engaged, this energizes transfer start relay 477. Relay contacts 477a and 477c close to shunt the commutator switch. Relay contacts 477d and 477f close to energize time delay relay 479, which begins to heat. Relay contacts 477k and 477n close to energize relay 339. As shown in FIGURE 10 this ungrounds conductor 331 and connects it to input 51. However, the operation of servo 207 in FIGURE 5 maintains output 51 zero. Relay contacts 477g and 477j, FIGURE 14, close to complete the control circuit for keying oscillator 585, which supplies its output at 592 to mixer 590, and the radio command link operates to energize relay 633 so that contacts 633a and 633c come into engagement. As shown in FIGURE 19 this results in energization of transfer relay 832: relay contacts 832g and 832j close to energize precision relay 726 and indicator 942, which gives the human pilot visual warning that the automatic equipment is about to take control of the aircraft for the final descent.

In FIGURE 18 relay contacts 832a and 832c close to reduce the signal at terminal 831 from network 720 to zero, thus allowing channels 781 and 782 to center themselves: for this purpose resistor 833 is of negligible resistance compared to resistors 823, 824, 834, and 835. Relay contacts 832d and 832f engage to add a further centering voltage through summing resistor 873: this voltage is of a sense to cause the aircraft to nose up, and it is effective in only the integral channel 782 of the coupler for as long as contacts 832d and 832f are engaged.

Energization of relay 726 acts through contacts 726a, 726b, and 726c, FIGURE 18, to disconnect the altitude control input at 780 and substitute the vertical error input at 625. However, the carrier based phase shifter 365, FIGURES 14 and 10, is still in its zero position, so no signal is supplied to voltage divider 723.

In FIGURE 19, relay contacts 726g and 726j close in parallel with relay contacts 832g and 832j, and relay contacts 726s and 726u close in parallel with relay contacts 832k and 832n. Relay contacts 726k and 726m open the holding circuit for altitude engage switch 977, which therefore drops out, and relay contacts 726p and 726q open the circuit for the altitude engage solenoid 772. Output device 773 of FIGURE 17 spring-centers, if it was not already at the center, and the input to the automatic pilot from this source becomes zero.

From the foregoing it will be evident that the altitude control signal has been removed from the automatic pilot so that the latter can stabilize the aircraft in a standard pitch attitude, except for the slowly increasing effect of the integral output at 702 due to the additional centering signal supplied by relay contacts 832d and 832f, FIGURE 18. It has been found advisable to reduce the airspeed of the aircraft by 12 knots at this time, and this calls for a nose up change in the attitude of the aircraft. Time delay relay 479 requires two seconds to heat up: during this two seconds the additional centering voltage brings about this needed change in the pitch attitude of the aircraft by the signal added in the automatic pilot on conductor 702.

At the end of two seconds relay 479 operates. As shown in FIGURE 14, relay contacts 479d and 479e open to interrupt keying of oscillator 585, and relay 633 is de-energized. In FIGURE 19 relay contacts 633a and 633c open to de-energize transfer relay 832. Relay contacts 832g and 832j and relay contacts 832k and 832n open, but each is shunted by contacts of relay 726, and no circuit change results. Relay contacts 832d and 832f, FIGURE 18, open, removing the nose-up command signal through resistor 855, and relay contacts 832a and 832c open, removing the shunt from terminal 831. Relay contacts 479a and 479c, FIGURE 5, close, grounding the input to servo 207 and hence fixing the signal to summing amplifier 203 on conductor 204: any change in the altitude of the aircraft now results in a signal at 51 which is transmitted through relay contact 330c and 330a, FIGURE 10. This signal in series with the bridge 333 energizes amplifier 363, and motor 353 runs to unbalance bridge 363 by an amount equal and opposite to the signal 51, when the amplifier input becomes zero and motor 353 stops. In doing this, the motor has adjusted phase shifter 365 in proportion to the change in altitude, and as shown in FIGURE 14, oscillator 580 is modulated and the resulting radio signal is demodulated and appears as a D.C. output 625. FIGURE 18 shows that this output is supplied to amplifiers 707 and 714 and results in signals 702 and 704 to adjust the automatic pilot as shown in FIGURE 15.

The aircraft is thus caused to fly at a constant altitude based on radar signal 35. Since it is approaching the carrier its distance therefrom is constantly decreasing, and for a given airspeed the time to touchdown decreases at the same rate: motor 102 of FIGURE 5 accordingly drives path analog 111 at a fixed rate and output 214 continuously decreases. The input 212 is fixed, because servo 207 is locked by relay contacts 479a and 479c: presently signal 214 becomes less than signal 212, and relay 209 of comparator 213 energizes relay 194. As shown in FIGURE 5 this results, by operation of relay contacts 194d, 194e, and 194f, in substitution of the pitch analog signal 210 for that from device 205 as signal 204 to amplifier 203, and output 51 is now the departure of the aircraft altitude from the path analog instead of from a fixed value. As shown in FIGURES 6 and 13, relay contacts 194a and 194c close to set motor 187 in operation, and it runs until limit switch 557 operates, changing the energization of voltage dividers 113 and 114 of path analog 111.

Closure of relay contacts 194k and 194n, FIGURE 14, completes the keying circuit for oscillator 586, and the radio signal causes relay 636 to operate. As shown in FIGURE 19, relay contacts 636a and 636c close to engage nose down relay 821: in FIGURE 18 this relay acts through relay contacts 821c and 821a to supply a fixed nose down signal through summing resistor 796 to amplifier 714, and this gives a signal at 704 calling for a different pitch attitude of the aircraft. If this pitch attitude is exactly right, the aircraft descends at 11 feet per second and no path error signal appears at 625: if the pitch attitude is not quite right a resulting error signal appears at 625 and acts through both the integrating and the proportioning channels of the coupler to permanently correct the pitch attitude of the aircraft, so that it does follow the desired path.

As the aircraft continues to approach the carrier its time to touchdown decreases and contactors 225 and 226, FIGURE 5, move clockwise. When contactor 225 moves off segment 227, FIGURE 13, relay 506 is de-energized. Relay contacts 506a and 506b close to again energize relay 421: as seen in FIGURE 10 this acts through contacts 421a, 421b, and 421c and through contacts 421d, 421e, and 421f to substitute the lower values for standard voltages to comparators 371 and 370. Relay contacts 506d and 506f open, interrupting the keying circuit for oscillator 586, and the radio command link de-energizes relay 636. FIGURE 19 shows that this acts as relay contacts 636a and 636c to de-energize relay 821, and in FIGURE 18 this removes the constant signal through resistor 796. This operation of contact 225 takes place at the same time that slider 116, FIGURE 6, moves downward from tap 132, which corresponds to the point E in FIGURE 2. The aircraft changes from descending flight to level flight, sliders 115 and 116 move along short circuited portions of windings 117 and 120, and contacts 225 and 226 continue to move clockwise.

Contactor 226 is moving along winding 233 and a decreasing signal representative of $t$ is being supplied at 61 to comparator 426 of tip range computer 46, as shown in FIGURE 11. When $t$ reaches a value of .5 second comparator 426 energizes relay 437, and in FIGURE 13 this results in closing of relay contacts 437a and 437c to energize relay 272. Contacts 272d and 272f close to complete a holding circuit for relay 272, and contacts 272a, 272b, and 272c, of FIGURE 8 unground output 60 and connect it to slider 257. It has been pointed out previously that this slider gives a voltage proportional to the distance $GG_1$ for example in FIGURE 3, which represents the change in distance $y$ at which the final tip signal must be given for the particular condition of craft altitude error and predicted deck elevation error existing. The addition of this $\Delta y$ voltage at 60, FIGURE 5, causes adjustment of motor 102 to advance or delay the movement of contactors 225 and 226: if the latter is moved earlier than .5 second before touchdown, relay 272 remains energized because of its holding circuit even though contacts 437a and 437c open. Amplifier 251, FIGURE 8, can still cause operation of motor 252 to correct the position of slider 257 if $E_h$ or $\Delta h$ changes.

The aircraft continues to approach the touchdown point, and contactor 225 engages segment 230, FIGURE 13, completing the energizing circuit for relays 241 and 541. Relay contacts 241g and 241j close to complete a holding circuit for the relays. Relay contacts 241a, 241b, and 241c, FIGURE 5, disconnect conductor 61 from contactor 226, and substitute a small fixed signal from source 96 to insure that comparator 426 remains energized. Relay contacts 241d and 241e, FIGURE 13, open to disable a wave-off circuit to be described below. Relay contacts 541a and 541c in FIGURE 8 close to ground the input to amplifier 251 and thus lock slider 257.

Relay contacts 241k and 241n, FIGURE 14, close to key oscillator 587, and the ratio command link energizes relay 641. As shown in FIGURE 19, relay contacts 641a and 641c close to energize final tip relay 819, and this is shown in FIGURE 18 as closing contacts 819c and 819a to supply a second fixed signal to amplifier 714 through resistor 796: this voltage is smaller than that supplied by operation of relay 821, since the final glide is to be at 9 feet per second rather than at 11 feet per second. At the same time slider 115 moves downward from tap 125, and the path analog signal is again variable: the aircraft proceeds down the final slope to touchdown.

The operation of the wave-off circuitry shown in FIGURES 10 and 13 is as follows. The actual altitude of the aircraft is supplied as an input to comparator 372, FIGURE 10, together with a standard signal on 416 representative of the minimum altitude which the aircraft is to be permitted to assume under automatic control. If the aircraft goes below this "floor" altitude comparator 372 energizes relay 375, and contacts 375a and 375c engage. A circuit is now completed in FIGURE 13 from bus 446 through conductor 466, switch 465, conductors 464, 471, 474, and 473, relay contacts 375a and 375c, conductors 472 and 460, relay contacts 241d and 241e, conductors 453 and 452, to wave-off relay 450, the circuit being completed to ground by conductor 451. Relay 450 is energized and contacts 450a and 450c close to complete the holding circuit for the relay. Relay contacts 450d and 450f close to complete the energization circuit for wave-off lamp 493. Relay contacts 450g and 450h open to de-energize standby relays 92 and 193: the contacts of relay 92 restore coordinate translator 44 of FIGURE 5 to its initial set condition. Relay contacts 193a, 193b, and 193c, FIGURE 13, energize motor 187 to drive back to the end of its travel at which limit switch 555 is open. Relay contacts 193d, 193e, and 193f deenergize blue lamp 524 and energize green lamp 520. Relay contacts 193g and 193j open to de-energize contact 225, thus interrupting energization of relay 506 or relays 241 and 541. Relay contacts 193k and 193n open to de-energize Δy relay 272.

De-energization of relay 194 or relay 241 results, by the action of the radio command link, in de-energization of relay 636 or relay 641, FIGURE 14. This de-energizes relays 819 and 821 of FIGURE 19, and no fixed signal is supplied to amplifier 714 of FIGURE 18.

Relay contacts 450k and 450a close to key oscillator 584, FIGURE 14, and radio command link accordingly energizes relay 630, causing relay contacts 630a and 630b to open. As shown in FIGURE 19, this de-energizes relay 916, and relay contacts 916a and 916b engage, energizing wave-off relay 923, which completes its holding circuit through contacts 923a and 923c. Lamp 935 is simultaneously energized for flashing operation. Relay contacts 923d and 923e open the ground circuit for automatic pilot switch 964 and ACCA switch 994 and these switches drop out, deenergizing elevator engage relay 896, vertical coupler relay of 793, and ACCA relay 931. The latter relay de-energizes indicator 942, transfer relay 832, and precision relay 726, and also either nose-down relay 821 or final tip relay 819, if either of these is energized, by opening contacts 931d and 931f. Full control of the aircraft is thus restored to the human pilot: the airborne equipment can be restored to its initial condition by momentarily opening circuit breaker 891. Normal operation of the carrier based equipment is restored by momentarily operating switch 465, to de-energize relay 450 by breaking its holding circuit.

Wave-off may also be accomplished at the will of the carrier operator by closing switch 455: this is provided so that if emergencies arise on the deck of the carrier, any landing which is in progress can be interrupted.

Referring again to FIGURE 10, the altitude error of the aircraft on conductor 331 is supplied as a first signal to comparators 371 and 370, and standard signals of opposite senses are supplied on conductors 422 and 425. During the nose-down portion of the landing these signals are of relatively large magnitude, and during the final tip portion these are reduced in magnitude by relay 421. Whenever the altitude error of the aircraft with respect to the path analog exceeds the standard in either sense, comparator 371 energizes relay 374 or comparator 370 energizes relay 373. FIGURE 13 shows how these relay contacts are in shunt with relay contacts 375a and 375c, so that any one is capable of causing wave-off.

When the final tip signal is given, the aircraft is intended to go lower than the "floor" altitude, and nothing but total loss of control could be accomplished by restoring the aircraft to the human pilot such a short time before contact. Therefore the wave-off circuit is disabled when the final tip order is given. This is accomplished as shown in FIGURE 13 by contacts 241d and 241e which open when final tip relay 241 is engaged.

The invention has been described as applied to the problem of landing aircraft on carrier decks, but it will be apparent that the same principles can be applied to the simpler problem of landing aircraft at airports, and the invention encompasses both carrier-based and land-based operations.

Numerous objects and advantages of the invention have been set forth in the foregoing description, together with details of the structure and function of the invention, and the novel features thereof are pointed out in the appended claims. This disclosure, however, is illustrative only, and changes may be made in detail, especially in matters of shape, size, and arrangement of parts, within the principle of the invention to the full extent indicated by the broad general meaning of the terms in which the appended claims are expressed.

We claim as our invention:

1. Apparatus of the class described comprising, in combination: means giving a first signal continuously representative of the desired altitude of an aircraft following a predetermined descent path having at least one sloping portion connected to two different level portions; means giving a second signal representative of the slope of said sloping portion; control means normally controlling the aircraft in elevation in accordance with said first signal; and means supplying said second signal to said control means in addition to said first signal while the craft is following said sloping portion of said path.

2. In a control system in combination: control means for adjusting the value of a condition in accordance with an input signal; means supplying a first input to said control means to maintain said condition at a first fixed value; means supplying a schedule signal which decreases linearly with time from a maximum value at a predetermined rate; means adding a fairing signal to said schedule signal, including means reducing said fairing signal to zero at the same rate that said condition can change from a constant value to said predetermined rate of decrease; means supplying a step function signal of a magnitude to cause decrease in said condition at said predetermined rate after transients have subsided; and means substituting said schedule, fairing, and step function signals for said input signal when said schedule signal becomes equal to said first fixed value.

3. In a control system in combination: control means for adjusting the altitude of an aircraft in accordance with an input signal; means supplying a first input to said control means to maintain said altitude at a first fixed value; means supplying a schedule signal which decreases linearly with time from a maximum value at a predetermined rate; means adding a fairing signal to said schedule, including means reducing said fairing signal to zero at the same rate that the altitude of said aircraft can change from a constant value to said predetermined rate of decrease; means supplying a step function signal of a magnitude to cause descent of the aircraft at said predetermined rate after transients have subsided; and means substituting said schedule, fairing and step function signals for said input signal when said schedule signal becomes equal to the first fixed value.

4. Apparatus of the class described comprising, in combination: means giving a first signal continuously representative of the scheduled altitude of an aircraft following a predetermined descent path having first and third level portions and second and fourth downwardly sloping nose-down and final tip portions, means giving second and third signals representative respectively of the slopes of said let down and final tip portions, means normally controlling the altitude of the aircraft in accordance with said first signal, means supplying said second signal to said control means in addition to said first signal while the aircraft is on the nose-down portion of the path, and means supplying said third signal to said control means in addition to said first signal while the aircraft is on the final tip portion of the path.

References Cited by the Examiner
UNITED STATES PATENTS

| | | | |
|---|---|---|---|
| 2,612,331 | 9/52 | Frazier | 244—77 |
| 2,817,479 | 12/57 | Newell | 235—186 |
| 2,830,291 | 4/58 | Hecht | 343—108 |
| 2,844,817 | 7/58 | Green | 343—112 |
| 2,871,469 | 1/59 | Franke | 343—108 |
| 2,878,469 | 3/59 | Casabona | 343—112 |
| 2,927,751 | 3/60 | Daspit. | |
| 2,996,706 | 8/61 | Newell et al. | 343—7 |

MILTON BUCHLER, *Primary Examiner.*
NORMAN H. EVANS, CHESTER L. JUSTUS,
*Examiners.*